(12) United States Patent
Zhong et al.

(10) Patent No.: US 10,512,971 B2
(45) Date of Patent: Dec. 24, 2019

(54) POWER TOOL AND OPERATION METHOD FOR QUICK LOCKING AND RELEASING WORKING ATTACHMENT THEREOF

(71) Applicant: Positec Power Tools (Suzhou) Co., Ltd., Suzhou (CN)

(72) Inventors: Hongfeng Zhong, Suzhou (CN); Shisong Zhang, Suzhou (CN); Yichun Ma, Suzhou (CN); Shangliang Run, Suzhou (CN)

(73) Assignee: Positec Power Tools (Suzhou) Co., Ltd., Suzhou (CN)

( * ) Notice: Subject to any disclaimer, the term of this patent is extended or adjusted under 35 U.S.C. 154(b) by 701 days.

(21) Appl. No.: 14/914,944

(22) PCT Filed: Aug. 28, 2014

(86) PCT No.: PCT/CN2014/085385
§ 371 (c)(1),
(2) Date: Feb. 26, 2016

(87) PCT Pub. No.: WO2015/027933
PCT Pub. Date: Mar. 5, 2015

(65) Prior Publication Data
US 2016/0221085 A1  Aug. 4, 2016

(30) Foreign Application Priority Data
Aug. 28, 2013  (CN) .......................... 2013 1 0381888

(51) Int. Cl.
*B25B 5/00* (2006.01)
*B23B 31/10* (2006.01)
(Continued)

(52) U.S. Cl.
CPC .............. *B23B 31/10* (2013.01); *B25F 5/001* (2013.01); *B25F 5/029* (2013.01); *B23B 2231/06* (2013.01); *B23B 2231/14* (2013.01)

(58) Field of Classification Search
CPC ............ B23B 31/10; B23B 31/101–39; B23B 2231/06
(Continued)

(56) References Cited

U.S. PATENT DOCUMENTS 4,317,578 A   3/1982   Welch
4,669,932 A   6/1987   Hartley
(Continued)

FOREIGN PATENT DOCUMENTS

CN   101426620 A   5/2009
CN   101284378 B   6/2010
(Continued)

OTHER PUBLICATIONS

Extended European Search Report for application No. 14840100.3, dated Apr. 13, 2017.
(Continued)

*Primary Examiner* — Chelsea E Stinson
(74) *Attorney, Agent, or Firm* — Marshall, Gerstein & Borun LLP

(57) ABSTRACT

A power tool and operation method for quick locking and releasing working attachment thereof are provided. The power tool includes a housing; a motor in the housing; an output shaft driven by the motor; and a chuck to lock and release a working attachment, said chuck including a chuck body coupled with the output shaft, jaws movably disposed relative to the chuck body, and a clamping sleeve outside the chuck body. The clamping sleeve is movable with respect to the chuck body so as to drive the jaws to retract and open relative to the chuck body. A control mechanism is operable
(Continued)

to lock the clamping sleeve or the chuck body relative to the housing, and to control the motor initiating along a preset rotary direction so that relative movement between the clamping sleeve and the chuck body is generated.

26 Claims, 18 Drawing Sheets

(51) Int. Cl.
  *B25F 5/00* (2006.01)
  *B25F 5/02* (2006.01)
(58) Field of Classification Search
  USPC .............................................................. 173/2
  See application file for complete search history.

(56) References Cited

U.S. PATENT DOCUMENTS

| | | | |
|---|---|---|---|
| 5,337,634 | A | 8/1994 | Carnesi |
| 7,198,439 | B2 | 4/2007 | Hoffmann et al. |
| 7,258,351 | B2 | 8/2007 | Hoffmann et al. |
| 7,478,979 | B2 | 1/2009 | Zhou et al. |
| 7,491,020 | B2 | 2/2009 | Gehret et al. |
| 7,644,931 | B2 | 1/2010 | Mack |
| 7,699,566 | B2 | 4/2010 | Nickels, Jr. et al. |
| 7,753,381 | B2 | 7/2010 | Nickels, Jr. et al. |
| 7,942,211 | B2 | 5/2011 | Scrimshaw et al. |
| 8,091,650 | B2 | 1/2012 | Van der Linde et al. |
| 8,387,719 | B2 | 3/2013 | Scrimshaw et al. |
| 8,607,893 | B2 | 12/2013 | Kumagai et al. |
| 8,714,566 | B2 * | 5/2014 | Campbell ........... B23B 31/1238 279/62 |
| 9,174,281 | B2 | 11/2015 | Schenk |
| 9,694,428 | B2 * | 7/2017 | Tussing ................... B25F 3/00 |
| 2003/0075880 | A1 | 4/2003 | Girardeau |
| 2006/0244223 | A1 | 11/2006 | Zhou et al. |
| 2007/0080506 | A1 | 4/2007 | Tan |
| 2009/0114410 | A1 | 5/2009 | Van Der Linde et al. |
| 2013/0277923 | A1 * | 10/2013 | Campbell ............. B23B 31/123 279/126 |

FOREIGN PATENT DOCUMENTS

| | | |
|---|---|---|
| CN | 102139482 A | 8/2011 |
| CN | 202377572 U | 8/2012 |
| CN | 102962496 A | 3/2013 |
| CN | 103252513 A | 8/2013 |
| EP | 0668118 A1 | 8/1995 |
| EP | 1040888 A1 | 10/2000 |
| EP | 2433728 A2 | 3/2012 |
| FR | 2891757 A1 | 4/2007 |
| JP | H01281804 A | 11/1989 |
| JP | 2010155295 A | 7/2010 |
| JP | 2013146846 A | 8/2013 |

OTHER PUBLICATIONS

International Search Report for PCT/CN2014/085385 dated Nov. 25, 2014.

Examination Report for EP 14840100.3, dated Jan. 18, 2019.

Examination Report for Australia Application No. 2014314778, dated Jul. 5, 2017.

* cited by examiner

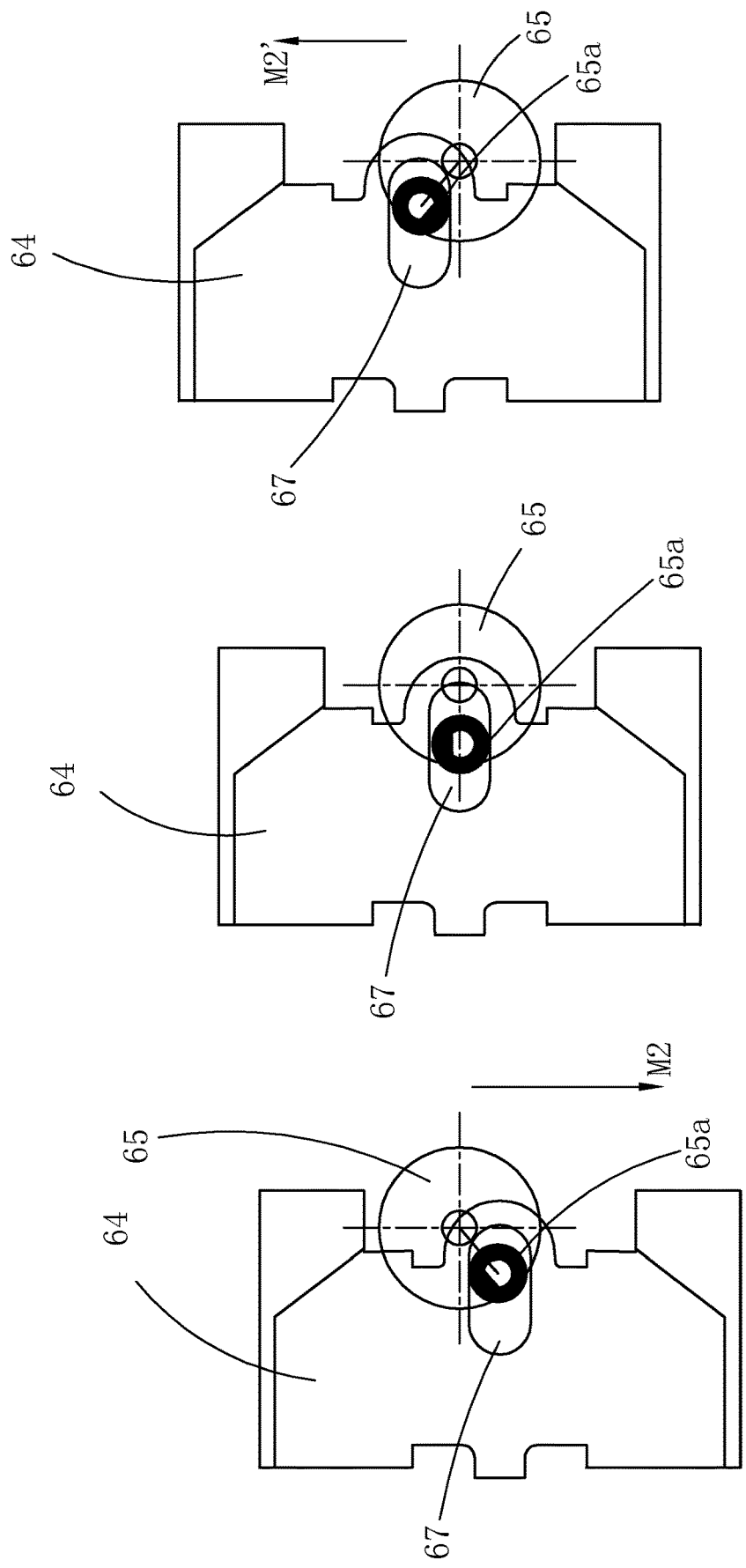

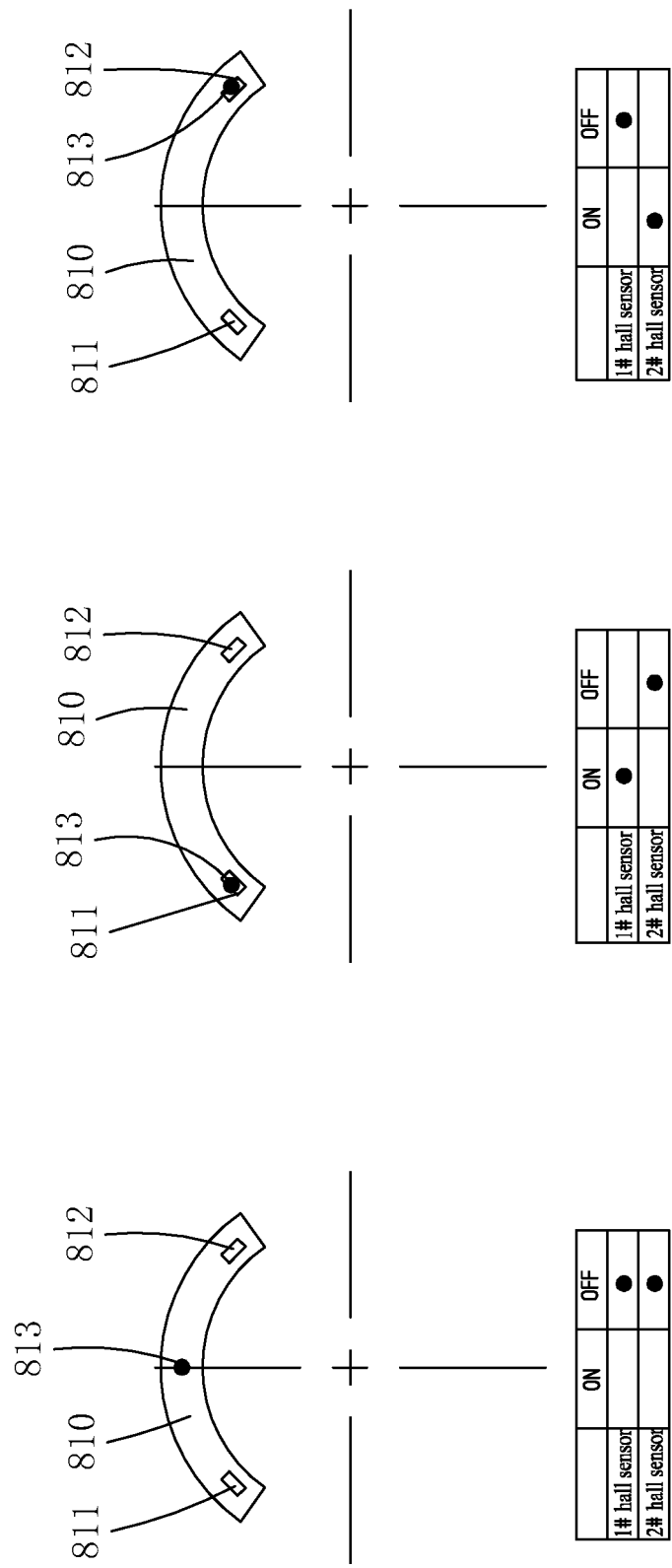

POWER TOOL AND OPERATION METHOD FOR QUICK LOCKING AND RELEASING WORKING ATTACHMENT THEREOF

BACKGROUND

Technical Field

The present invention relates to a power tool and operation method for quick locking and releasing working attachment thereof.

Related Art

A handheld power tool such as a drill is used to bore a hole in a workpiece such as a wood. A chuck used to lock a working attachment is installed on a main shaft of the handheld power tool. Drill bits of different specifications and types may be selected for the working attachment. When a drill bit is replaced and installed or is replaced, first, the chuck needs to be opened or a drill bit that is originally clamped in the chuck is released, an original drill bit is taken out of the opened chuck, and then, a new drill bit is inserted and then is locked in the chuck. There are about two forms of common chucks. A first chuck, such as a chuck device disclosed in the Chinese Patent Application CN201210036766.6, includes a chuck body coupled with a main shaft of an electric tool, a plurality of jaws movably disposed on the chuck body, and a clamping sleeve sleeved at an outer side of the chuck body and in a threaded connection to the jaws, where the clamping sleeve is rotated by hand, to make the clamping sleeve and a still output shaft relatively rotate; rotation of the clamping sleeve makes the jaws in screw thread fit with the clamping sleeve produce displacement reciprocally relative to the chuck body along an axial direction of the main shaft, and retraction or opening of the clamping jaws implements locking or releasing of the drill bit. A second chuck, such as a chuck device disclosed in the U.S. Pat. No. 7,198,439B2, includes a chuck body coupled with a main shaft of an electric tool, a plurality of jaws movably disposed on the chuck body, and a nut sleeve sleeved at an outer side of the chuck body and in a threaded connection to the chuck body, where the nut sleeve can move relative to an axial direction of the chuck body; axial movement of the nut sleeve can push the clamping jaws to produce displacement along the axial direction; the nut sleeve is rotated by hand, to make the nut sleeve and a still output shaft relatively rotate; rotation of the nut sleeve makes the nut sleeve reciprocally move relative to the chuck body along an axial direction of the main shaft; reciprocating movement of the nut sleeve can push the clamping jaws to produce displacement along the axial direction; and retraction or opening of the clamping jaws implements clamping or releasing of the drill bit. When the drill bit is quickly locked or released, the clamping sleeve or the nut sleeve needs to be fixed by hand to make the nut sleeve or the drill bit retain a still status relative to a housing, and then, a power switch of the electric tool is switched on; in this case, an electric motor drives the main shaft to rotate to drive the chuck body to rotate; and when the chuck body rotates relative to the clamping sleeve, the jaws produce displacement relative to the chuck body along the axial direction of the main shaft, to make the jaws lock or release the drill bit clamped in the jaws. However, in such an operation manner, when the drill bit is clamped or released to an extreme position, the clamping sleeve is engaged with a screw thread pair of the jaws or the nut sleeve is engaged with a screw thread pair of the chuck body, and the clamping sleeve or the nut sleeve also rotates, and causes friction with the hand, leading to a safety problem.

Currently, on the market, some drills for which a drill bit can be quickly locked and released emerge, and an operation part that is controlled manually is generally disposed on such drills, where a clamping sleeve is first locked relative to a position of a housing, so that when the main shaft drives a chuck body to rotate, jaws can lock or release the drill bit. In addition, a drilling device is disclosed in the Chinese Patent Application CN201210143284.0, where a chuck of the drilling device has a clamping mode and a drilling mode; in clamping mode, the chuck is fixed relative to a housing, and a screw element moves forward or backward along an axial direction to adjust the clamping jaws to clamp or release; and in the drilling mode, a chuck body is driven by a main shaft to rotate. That is, the drill bit can be locked or released as long as either of the clamping sleeve and the chuck body can be locked relative to a position of the housing and the clamping sleeve and the chuck body relatively move.

In order to make a main shaft rotate in locking or releasing mode, a rotation direction of the main shaft needs to be determined, that is, forward and reverse rotation control is performed, and then, a motor is started to make the main shaft rotate in set mode. In the prior art, locking of a clamping sleeve or a chuck body, forward and reverse rotation control, a start control structure are set separately, an operator needs to separately operate different parts to lock or release a drill bit; as a result, an operation is complex; in addition, a size of a power tool is huge due to many components and parts and complex connection relationships among the components and parts.

SUMMARY

In order to solve the above technical questions, the present invention provides a compact-sized power tool easy to operate that the working attachment thereof being quick locked and released.

According to some aspects, a power tool includes a housing; a motor disposed in the housing; an output shaft driven by the motor to output a rotary power; and a chuck configured to lock and release a working attachment, said chuck having a chuck body coupled with the output shaft, a plurality of jaws movably disposed relative to the chuck body, and a clamping sleeve sleeved outside the chuck body, the clamping sleeve is movable with respect to the chuck body so as to drive the plurality of jaws to retract and open relative to the chuck body. The power tool further includes a control mechanism. The control mechanism is operable to lock the clamping sleeve or the chuck body relative to the housing, and to control the motor initiating along a preset rotary direction so that relative movement between the clamping sleeve and the chuck body is generated.

Preferably, wherein the control mechanism comprises a control member being operable to move between an initial position and a working position, the control mechanism is active when the control member is located at the working position.

Preferably, wherein the power tool further comprises a reversing member for controlling the rotary direction of the motor, the control mechanism further comprises a first transmission mechanism connected between the control member and the reversing member, the reversing member is activated by the first transmission mechanism when the control member moves from the initial position to the working position.

Preferably, wherein the first transmission mechanism comprises a pair of reversing pushing blocks which are movably along the axial direction of the output shaft, and a reversing button which is movable along a direction perpendicular to the axial direction and is selectively slidable coupling with one of the reversing pushing blocks, the reversing pushing blocks are symmetrically disposed at two sides of the reversing button, the reversing button is configured to activate the reversing member.

Preferably, wherein the control mechanism further comprises a connecting member connected with the control member, the connecting member is rotatable relative to the housing and provided with a pair of first slopes, the reversing pushing blocks are respectively provides with a first inclined plane abutted against the corresponding first slope and a second inclined plane abutted against the reversing button, the reversing button is provided with a pair of reversing slopes abutted against the second inclined planes respectively.

Preferably, wherein the power tool further comprise a switch for switching on/off the motor, the control mechanism further comprises a second transmission mechanism connected between the control member and the reversing member, the switch is activated by the second transmission mechanism when the control member moves from the initial position to the working position.

Preferably, wherein the second transmission mechanism comprises a pushing button which is movable along the axial direction of the output shaft, the control mechanism further comprises a connecting member which is connected with the control member and rotatable relative to the housing, and the connecting member provided with a pair of second slopes, the pushing button is provided with a pair of pushing button slopes alternatively abutted against the second slopes, the pushing button is configured to activate the switch.

Preferably, wherein the control mechanism further comprises a clutch mechanism disposed between the control member and the clamping sleeve, the clutch mechanism is configured to be in an engaging status and a separating status, the clutch mechanism converts from the separating status to the engaging status when the control member moves from the initial position to the working position, so that the clamping sleeve is fixed relative to the housing.

Preferably, wherein the clutch mechanism comprises a first clutch unit fixedly disposed relative to the clamping sleeve and a second clutch unit coupled with the control member, the second clutch unit is movable along the axial direction of the output shaft and is selectively engaged with the first clutch unit or separated from thereof.

Preferably, wherein a stop device is disposed between the first clutch unit and the second clutch unit, the stop device is fixed relative to the housing, and a second spring is disposed between the stop device and the second clutch unit.

Preferably, wherein a plurality of receiving chambers are disposed in the second clutch unit, and the second spring comprises a plurality of compression springs matched with the receiving chambers, the compression spring is at least partially supported in the receiving chambers.

Preferably, wherein the control mechanism further comprises a transmission member which is disposed in the housing and coupled with the control member, the control member drives the second clutch to move along the axial direction of the output shaft by the transmission member when the control member moves from the initial position to the working position.

Preferably, wherein a cam mechanism is disposed between the transmission member and the second clutch unit.

Preferably, wherein the cam mechanism comprises a first cam part disposed in the transmission member and a second cam part disposed in the second clutch unit, the first cam part abuts against the second cam part by rotating of the control member and the second clutch unit moving along the axial direction of the output shaft.

Preferably, wherein the first clutch unit comprises a first engaging member, the second clutch unit comprises a supporting part and a second engaging member axially slidably disposed on the supporting part, the second engaging member is selectively engaged with the first engaging member or separated from thereof.

Preferably, wherein a first spring is disposed between the second engaging member and the supporting part.

Preferably, wherein the first engaging member is configured as a ring gear, the second engaging member comprises a plurality of blocking pins being engagable with the ring gear, the supporting part comprises a plurality of restricting holes corresponding to the blocking pins, the blocking pins are at least partially received in the restricting holes, the first spring comprises a plurality of compression springs corresponding to the restricting holes, the compression springs are totally received in the corresponding restricting holes and abuts against the corresponding blocking pins.

Preferably, wherein the clutch mechanism comprises a first clutch unit fixedly disposed relative to the clamping sleeve and a clutch assembly coupled with the control member, the clutch assembly comprises an engaging member and a clutch member, the engaging member is engagable with the first clutch unit and separated from thereof and is movable along the axial direction of the output shaft, the clutch member is engagable with the engaging member and separated from thereof and is movable along the axial direction of the output shaft.

Preferably, wherein an elastic device is disposed between the control member and the housing, the elastic device is configured to provide an elastic force for returning the control member from the working position to the initial position.

Preferably, wherein the control mechanism further comprises a clutch mechanism disposed between the control member and the clamping sleeve, the clutch mechanism is configured to be in an engaging status and a separating status, wherein the clutch mechanism converts from the engaging status to the separating status when the control member moves from the working position to the initial position, so that locking of the clamping sleeve relative to the housing is unlocked.

Preferably, wherein the control mechanism further comprises a clutch mechanism disposed between the control member and the clamping sleeve, the clutch mechanism is configured to be in an engaging status and a separating status, wherein the power tool further comprises a retaining mechanism which is selectively engagable with the clutch mechanism or separated from thereof, the clutch mechanism is in the engaging status and engaged with the retaining mechanism when the control member moves from the initial position to the working position, so that the control member is retained in the working position.

Preferably, wherein an elastic device is disposed between the control member and the housing, the clutch mechanism is separated from the retaining mechanism when the clutch mechanism is in the engaging status, the elastic device is configured to provide an elastic force to return the control member from the working position to the initial position.

Preferably, wherein the control member is rotatable relative to the housing between the initial position and the working position, a rotation axis of the control member is parallel with or in line with the axis of the output shaft.

Preferably, wherein the working position comprises a first working position and a second working position, the control mechanism controls the motor to initiate in a first predetermined direction when the control member is in the first working position, the control mechanism control the motor to initiate in a second predetermined direction which is opposite to the first predetermined direction.

Preferably, wherein the first working position and the second working position are symmetrically disposed at two sides of the initial position.

Preferably, wherein the power tool further comprises a reversing member for controlling the rotating direction of the motor and a switch for switching on/off the motor, the control mechanism is operable to fix the sleeve relative to the housing, activate the reversing member and then activate the switch during the control mechanism moving from the initial position to the working position.

Preferably, wherein the control mechanism further comprises a clutch mechanism disposed between the control member and the clamping sleeve, the working position comprises a first working position, a second working position and a third working position, the clutch mechanism is disengaged when the control member is in the initial position; the clutch mechanism is engaged to fix the clamping sleeve relative to the housing when the control member is in the first working position; the reversing member is activated when the control member is in the second working position, the switch is activated when the control member is in the third working position.

Preferably, wherein two sets of the first working position, the second working position and the third working position are symmetrically disposed at two sides of the initial position.

Preferably, wherein the power tool comprises two operation modes comprise an auto mode of operating the control member to lock or release the working attachment, and a manual mode of operating the clamping sleeve to move relative to the chuck body.

According to some aspects, an operation method for quick locking and releasing working attachment of the power tool is provided, in which the operation method includes the following steps: operating the control member to move from the initial position to the working position, and then releasing the control member.

Preferably, wherein the control member is rotating from the initial position to the working.

Preferably, wherein the control mechanism comprises a control member operable to select to be in an initial status and a working status, a processor, a detecting circuit, and a driving circuit, wherein the detecting circuit is configured to detect a characteristic indicative of the control member physical state, the processor is configured to transmit a control signal according to a physical state characteristic detected by the detecting circuit, the driving circuit is configured to receive the control signal from the processor and control the motor initiating along a predetermined rotating direction.

Preferably, wherein the control member is movable disposed relative to the housing and is movable between an initial position corresponding to the initial status and a working position corresponding to the working status, wherein the detecting circuit comprises a first sensor for detecting the position of the control member.

Preferably, wherein the first sensor comprises at least two hall sensors.

Preferably, wherein the control mechanism further comprises a second sensor for detecting a characteristic indicative of the motor load, the processor compares the characteristic indicative of the motor load with a predetermined value, and the motor controls switching off when the characteristic indicative of the motor load exceeds to the predetermined value.

Preferably, wherein control member is configured as a signal switch, wherein when the signal switch is activated, an electric signal is generated and transmitted to the processor, the processor controls the motor initiating in a predetermined rotating direction in response to the electric signal.

Preferably, wherein the control mechanism further comprises an electromagnetic mechanism matched with the clamping sleeve or the chuck body, wherein the processor controls the electromagnetic mechanism to generate electric current to fix the clamping sleeve or the chuck body relative to the housing after the processor received the electric signal from the signal switch.

Preferably, wherein the power tool further comprises a reversing member for controlling the rotating direction of the motor and a trigger for switching on/off the motor, the processor controls the motor rotating along the predetermined direction according to the signal indicative of the reversing member, and the processor controls switch on/off the motor according to the signal indicative of the position of the trigger.

According to the power tool in the present invention, because the foregoing technical solutions are used, an operator only needs to perform a one-button operation, that is, rotates an element of an operation part to quickly lock or release a working attachment, so that the operation is simple and convenient; and because the design of a control mechanism for controlling the working attachment to be quickly locked or released is compact, the power tool has a light and handy body, and is convenient to carry.

In some aspects, a power tool includes a housing; a motor disposed in the housing; a main shaft driven by the motor to output rotary power; and a chuck, configured to lock and release a working attachment, the chuck including a chuck body coupled with the main shaft, a plurality of jaws movably disposed relative to the chuck body, and a clamping sleeve sleeved outside the chuck body. The clamping sleeve is movable with respect to the chuck body so as to drive the plurality of jaws to retract and open relative to the chuck body, and the power tool further includes a control mechanism and a retaining mechanism, the control mechanism including a control member that can be operated to move between an initial position and a working position, the control mechanism lock the clamping sleeve or the chuck body with the housing when the control member moves from the initial position to the working position, and then the retaining mechanism retain the control member at the working position.

According to some aspects, because the foregoing technical solution is used, the retaining mechanism can retain the control member at the working position as long as an operator moves the control member to the working position. Another mechanism does not need to be additionally operated manually to retain the control member at the working position, so that locking and releasing operations of the working attachment of the power tool are very convenient.

Preferably, the control member can rotate relative to the housing between the initial position and the working position, and a rotation axis of the control member is parallel to or is in line with a central axis of the main shaft.

Preferably, the control mechanism further includes a clutch mechanism disposed between the control member and the clamping sleeve. The clutch mechanism has an engaging status and a separating status, the retaining mechanism alternatively separate from or engage with the clutch mechanism, the control member moves from the initial position to the working position, the clutch mechanism is in the engaging status and is engaged with the retaining mechanism to retain the control member at the working position.

Preferably, the clutch mechanism includes a first clutch unit fixed relative to the clamping sleeve, and a second clutch unit coupled with the control member, the second clutch unit moves alone the axial direction of the main shaft and alternatively engage with or separate from the first clutch unit, and when the second clutch unit is engaged with the first clutch unit, the retaining mechanism fits the second clutch unit to retain the control member at the working position.

Preferably, the retaining mechanism includes a retaining member pivotably disposed relative to the control member, and a spring member that makes the retaining member contact with the second clutch unit all the time.

Preferably, the first clutch unit includes a first engaging member, and the second clutch unit includes a supporting part, and a second engaging member slidably disposed in the supporting part along the axial direction of the main shaft, the second engaging member alternatively engage with or separate from the first engaging member, the second engaging member includes a raised portion that extends outward along a circumferential direction, when the second engaging member is engaged with the first engaging member, the raised portion stops the retaining member, so as to retain the control member at the working position, and when the second engaging member is separated from the first engaging member, the raised portion is away from the retaining member.

Preferably, the working position includes a first working position for locking the working attachment and a second working position for releasing the working attachment, and there are at least two retaining members, where one retaining member is used to retain the control member at the first working position, and the other retaining member is used to retain the control member at the second working position.

Preferably, the control mechanism further includes a connecting member that is connected with the control member, the connecting member is rotatable relative to the housing, where a rotation axis of the connecting member is parallel to or is in line with the central axis of the main shaft, and the retaining member is pivotably disposed in the connecting member by using a pivot.

Preferably, a receiving chamber is disposed on the connecting member, an opening of the receiving chamber is located on an outer circumference surface of the connecting member, and the retaining member is at least partially received in the receiving chamber.

Preferably, the pivot is disposed in the receiving chamber, the spring member is configured as a torsional spring and is sleeved on the pivot, one end of the torsional spring abuts a side surface of the receiving chamber, and the other end of the torsional spring abuts the retaining member.

Preferably, an elastic device is disposed between the control member and the housing, the clutch mechanism is separated from the retaining mechanism, and the elastic device is provided with an elastic force for driving the control member to move from the working position to the initial position.

BRIEF DESCRIPTION OF THE DRAWINGS

The present invention is further described in detail below with reference to the accompanying drawings.

FIG. 14 is a schematic view of an adapting relationship between the reversing button and the reversing switch in FIG. 13, where the reversing switch is at a position for forward rotation in this case;

FIG. 15 is a schematic view of an adapting relationship between the reversing button and the reversing switch in FIG. 13, where the reversing switch is at an initial position in this case;

FIG. 16 is a schematic view of an adapting relationship between the reversing button and the reversing switch in FIG. 13, where the reversing switch is at a position for reverse rotation in this case;

FIG. 27 is a schematic view of detecting, by the drill in FIG. 26, a position of a control member by using a sensor, where the control member is located at an initial position in this case;

FIG. 28 is similar to FIG. 27, where the control member is located at a working position for releasing a drill bit in this case;

FIG. 29 is similar to FIG. 27, where the control member is at a working position for clamping the drill bit in this case;

DETAILED DESCRIPTION

Figure 1:
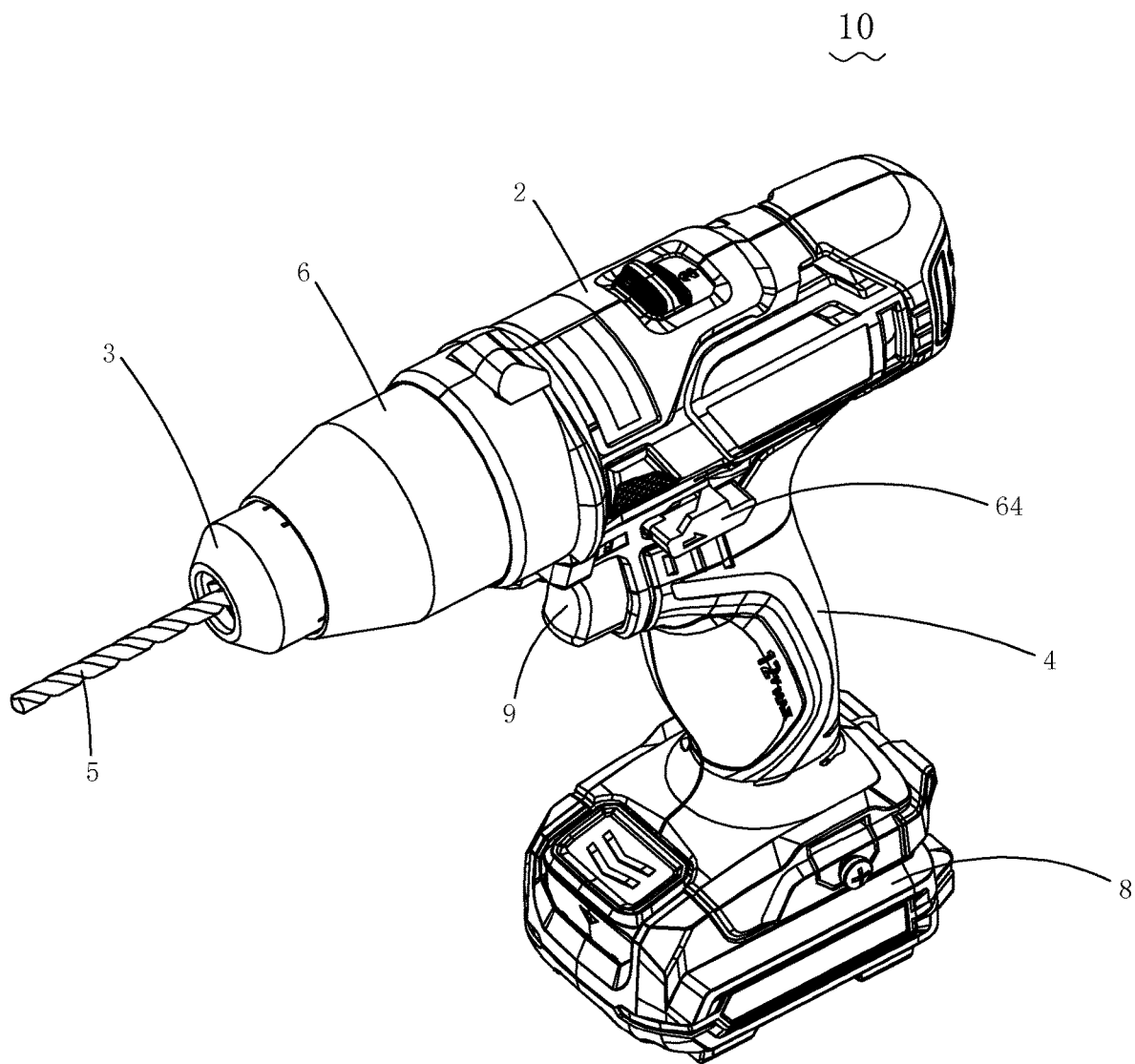
FIG. 1 is a schematic three-dimensional view of a drill according to a first preferred embodiment of the present invention.
Figure 2:
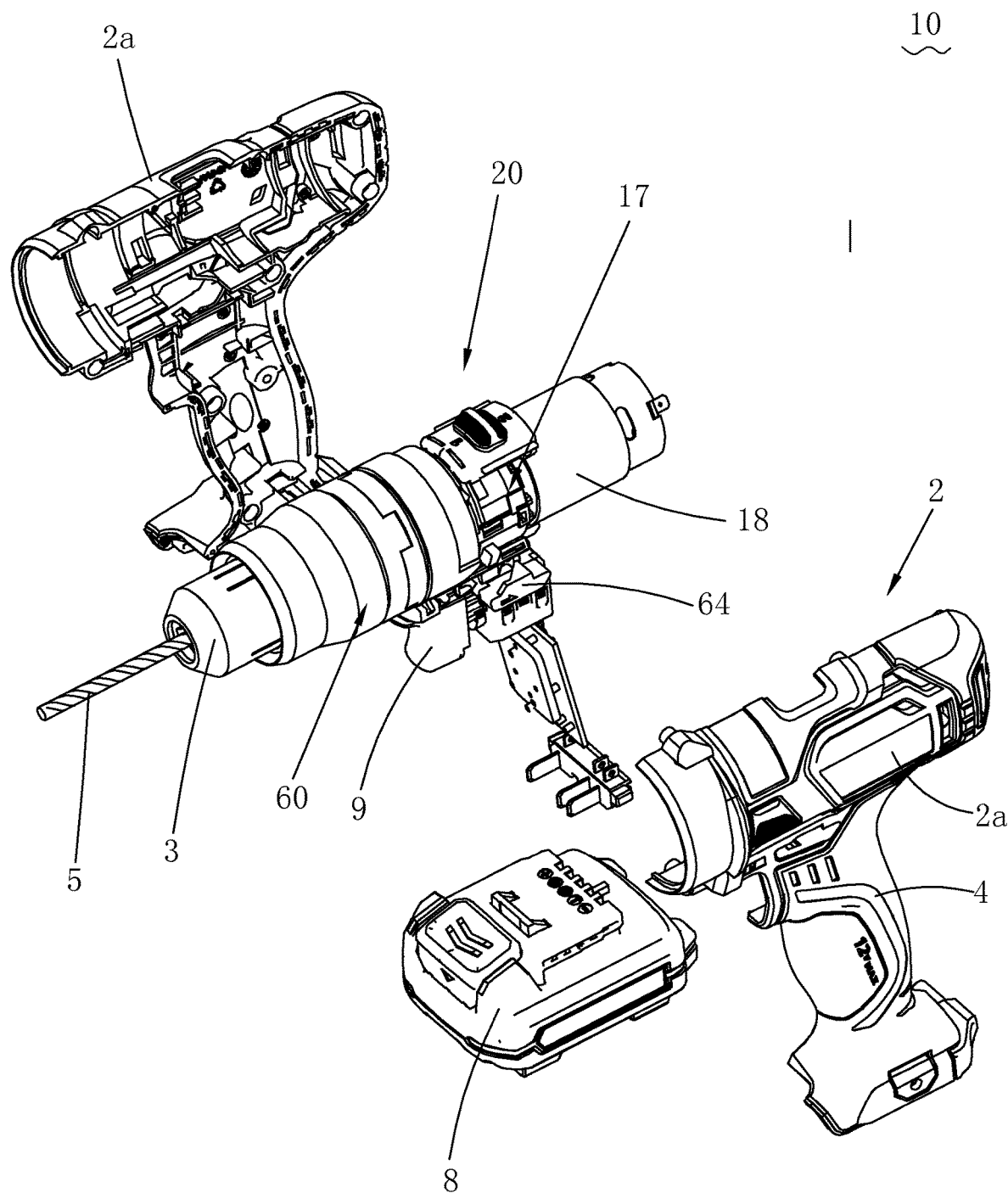
FIG. 2 is a schematic three-dimensional exploded view of housing and a body of the drill shown in FIG. 1.
Figure 3:
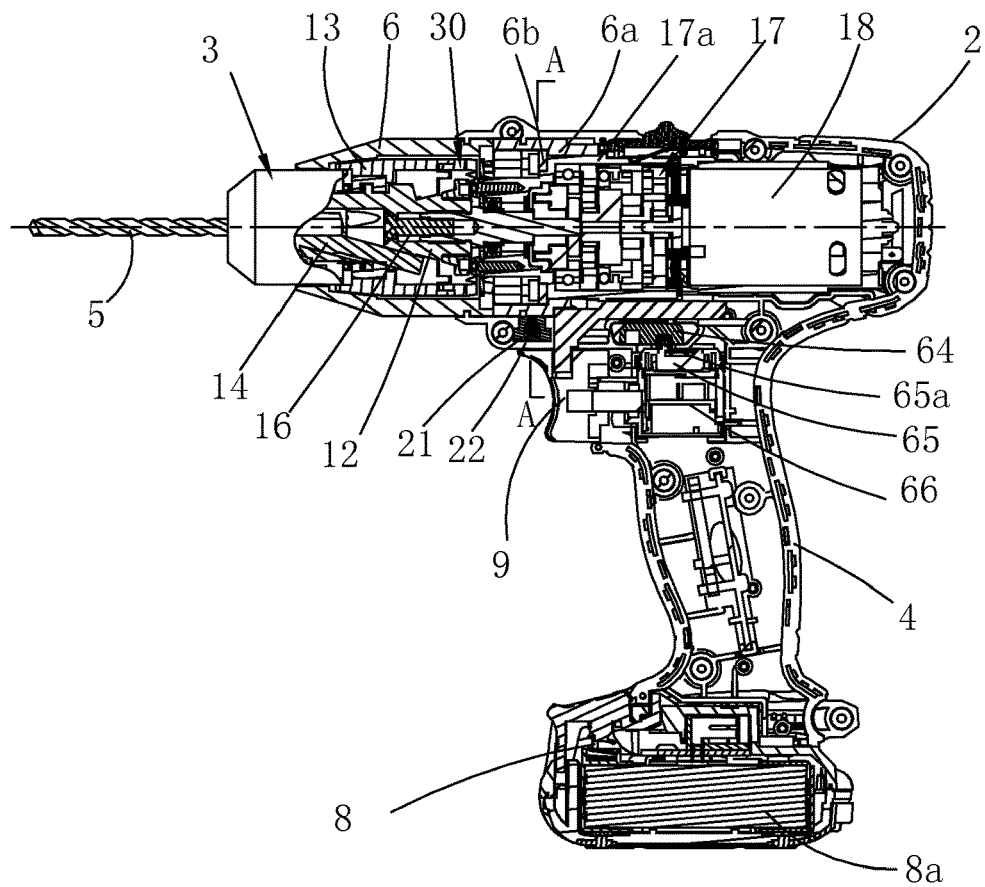
FIG. 3 is a sectional view of the drill shown in FIG. 1 along a front view direction.

Referring to FIG. 1 to FIG. 3, an embodiment of a power tool of the present invention uses a handheld drill 10. The drill 10 includes a housing 2 and a body 20, where the housing 2 is formed by connecting two half shells 2a. The housing 2 includes a main housing for receiving an electric motor 18, and handle housing used to form a handle 4. The main housing and the handle housing cross each other, and in this embodiment, the main housing of the drill 10 and the handle housing are disposed in a substantially perpendicular manner. One end, of the handle 4, away from the electric motor 18 is provided with a battery pack 8 for providing energy to the motor 18, and the battery pack 8 is detachably connected with the handle 4. The body 20 includes the motor 18, a chuck 3 driven by the motor 18 to rotate, a transmission mechanism 17 disposed between the chuck 3 and the motor 18, and a control mechanism 60. The chuck 3 is configured to clamp a working attachment, such as a drill bit, a screwdriver bit, a shovel header, or an adapter; and in this embodiment, a drill bit 5 is used as an example for description. The control mechanism 60 is configured to control the chuck 3 to quickly lock or release the drill bit 5. The control mechanism 60 includes a control member rotatably disposed relative to the housing 2. In this embodiment, the control member fits, in a form of a rotating sleeve 6, a shape of the housing 2, and is suitable to be rotated and operated manually and moves between an initial position and a working position relative to the housing 2, and when the control member is located at the working position, the control mechanism 60 activates. A rotation center line of the rotating sleeve 6 is coaxial with a central axis of a main shaft 16. Certainly, in this embodiment, the rotation center line of the rotating sleeve 6 may also be set to be parallel to the central axis of the main shaft 16. One end, of the handle 4, close to the motor 18 is provided with a reversing button 64 for controlling forward and reserve rotation of the motor 18, and a master switch button 9 used to control the motor 18 to start.

Figure 4:
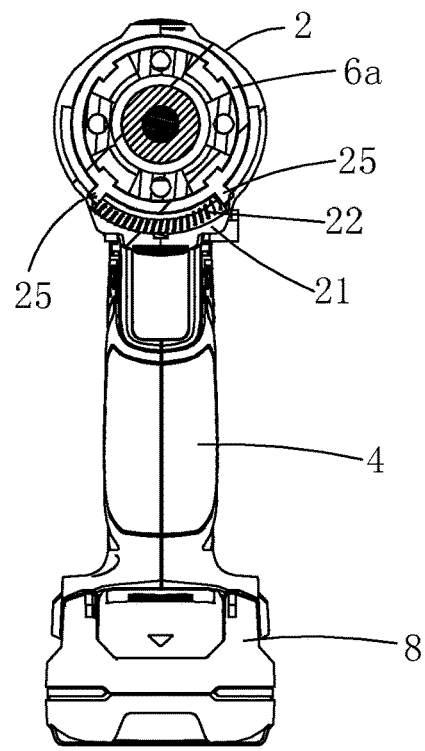
FIG. 4 is a sectional view along an A-A direction in FIG. 3.

Referring to FIG. 3 and FIG. 4, a master switch 66 for controlling the motor 18 to rotate and a reversing switch 65 for controlling a rotation direction of the motor 18 are disposed in the housing 2. The reversing switch 65 is provided with a toggle 65a, and the master switch button 9 is disposed at one side, of the handle 4, close to the chuck 3, and is convenient to operate and control. Certainly, in this embodiment, the master switch 66 and the reversing switch 65 may be integrated to one switch, and the reversing button 64 and the master switch button 9 (or a trigger) are activated to implement forward and reserve rotation settings of the motor 18 and starting of the motor 18. The battery pack 8 is provided with a rechargeable battery 8a, and in this embodiment of the present invention, a battery uses a lithium battery, and certainly may also use a lead battery, a nickel-cadmium battery, or another replacement. Rotary power of the motor 18 is transmitted to main shaft 16 by using the transmission mechanism 17. The transmission mechanism 17 is received in a transmission mechanism housing 17a. The chuck 3 includes: a chuck body 12 coupled with the main shaft 16, a plurality of jaws 14 movably disposed relative to the chuck body 12, and a clamping sleeve 13 sleeved outside the chuck body 12 and in thread engagement with the plurality of jaws 14. The drill bit 5 can be locked in the jaws 14 in a releasable manner, and in this embodiment of the present invention, there are three jaws 14. The main shaft 16 may be directly or indirectly connected with the chuck body 12. When the main shaft 16 drives the chuck body 12 to rotate, the jaws 14 produce displacement relative to the clamping sleeve 13 along an axial direction of the main shaft 16 as long as a position of the clamping sleeve 13 is fixed relative to the housing 2, so as to make the chuck 3 lock or release the drill bit 5 by using the jaws 14. A person skilled in the art may easily figure out according to the prior art that, relative movement of the chuck body and the clamping sleeve can make the jaws produce displacement along the axial direction of the main shaft; therefore, if the chuck body is fixed relative to a position of the housing, when the main shaft drives the clamping sleeve to rotate, the chuck may also be made to lock or release the drill bit by using the jaws. In the present invention, the control mechanism 60 can be operated to lock the clamping sleeve 13 or the chuck body 12 with the housing 2, and control the motor 18 to start in a preset rotation direction, so that the clamping sleeve 13 and the chuck body 13 move relatively, and the chuck 3 locks or releases the drill bit.

The control mechanism 60 further includes a connecting member 6a connected with the rotating sleeve 6 and located in the housing 2 and extending along the axial direction of the main shaft, and a transmission member 6b connected with the connecting member 6a and located at an inner side of the connecting member 6a. The rotating sleeve 6, the connecting member 6a, and the transmission member 6b are fixed relatively or may be integrally molded. A clutch mechanism 30 is disposed between the transmission member 6b and the clamping sleeve 13, and the clutch mechanism 30 has an engaging status and a separating status. An arc support 21 is disposed at a position, on the housing 2, close to the master switch button 9, a spring member is supported in a groove of the arc support 21, and in this embodiment, the spring member is configured as a compression spring 22. One pair of bumps 25 that are spaced from each other and are located at a position of the connecting member 6a that face the arc support 21. When the rotating sleeve 6 is located at the initial position, the compression spring 22 is located between the two bumps 25 and two ends of the compression spring 22 abut the bumps 25. When the rotating sleeve 6 is rotated and the rotating sleeve 6 drives the connecting member 6a to rotate towards one side, at least one bump 25 of the two bumps 25 abuts the compression spring 22 and make the compression spring 22 compressed. Once the rotating sleeve 6 is released, under an applied force of the compression spring 22, the rotating sleeve 6 automatically reversely rotates to the initial position, that is, the compression spring 22 provides an elastic force to make the rotating sleeve 6 return from the working position to the initial position. In this embodiment, the spring member is not limited to using the compression spring 22, and a person skilled in the art may use another elastic device for replacement, as long as an elastic returning force can be provided when the rotating sleeve 6 can be made to return from the working position to the initial position.

Figure 5:
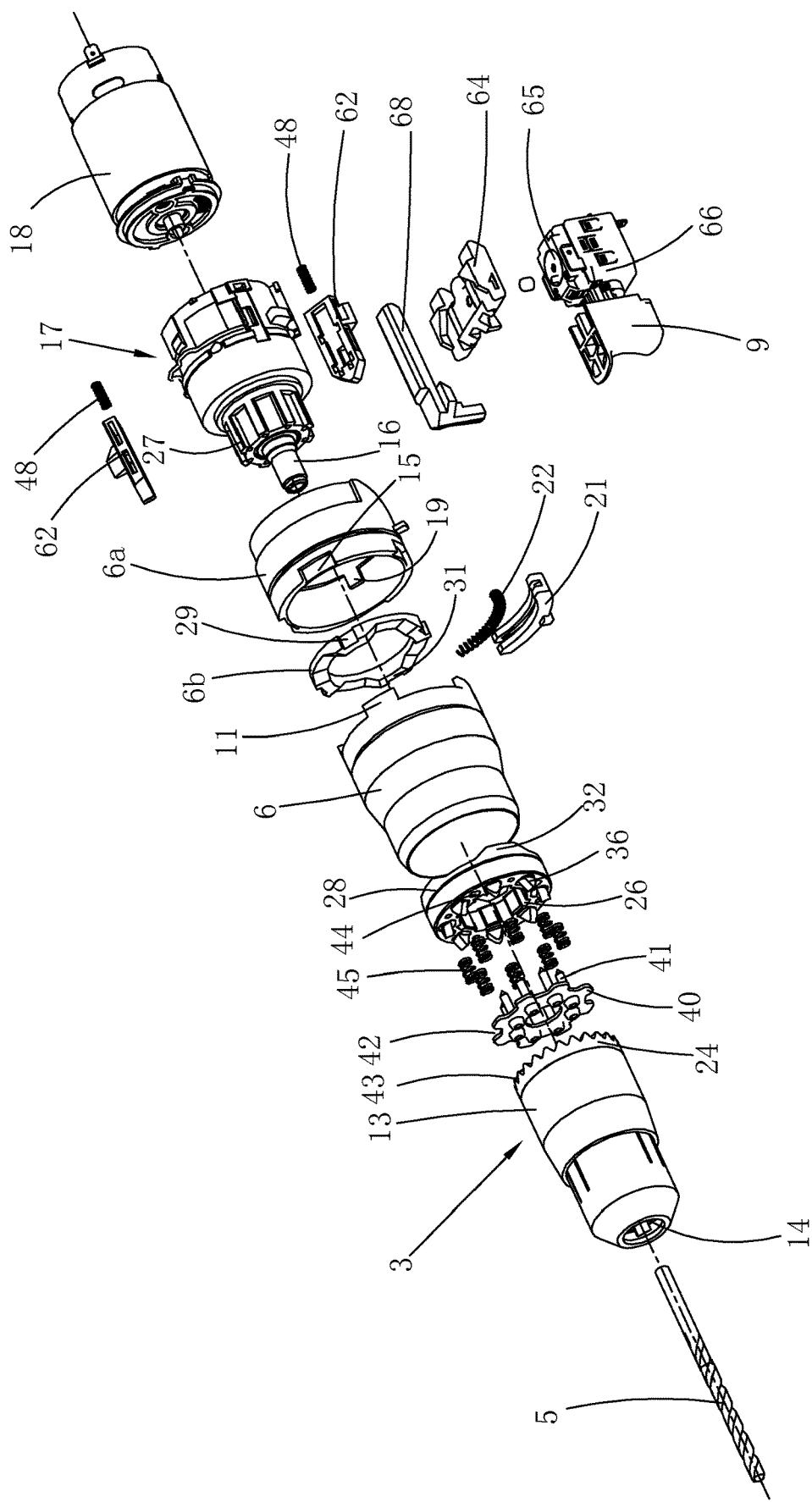
FIG. 5 is a schematic three-dimensional exploded view of the body of the drill shown in FIG. 2.

Referring to FIG. 5, one end, of the rotating sleeve 6, away from the chuck 3 are provided with spline teeth 11, and one end, of the connecting member 6a, close to the rotating sleeve 6 is provided with a keyway 15. The rotating sleeve 6 and the connecting member 6a tightly adapt by using the spline teeth 11 and the keyway 15. The connecting member 6a and the transmission member 6b are both configured as ring members. Spline teeth 19 are disposed on an inside wall of the connecting member 6a, and correspondingly, a keyway 29 is disposed on an outside surface of the transmission member 6b, and the transmission member 6b is connected with the interior of the connecting member 6a in a relatively fixed manner by means of fitting between the keyway 29 and the spline teeth 19. When the rotating sleeve 6 rotates relative to the housing 2, the connecting member 6a and the transmission member 6b are driven to rotate. The clutch mechanism 30 includes a first clutch member 24 fixedly disposed relative to the clamping sleeve 13 and a second clutch member 28 that adapts to the control member, where the second clutch member 28 moves along the axial direction of the main shaft 16 and alternatively engage with or separate from the first clutch member 24. In this embodiment, the first clutch member 24 is fixedly connected with the clamping sleeve 13, and in another optional solution, the first clutch member 24 and the clamping sleeve 13 may be integrally molded, and the second clutch member 28 is configured as a ring member. A plurality of first cam surfaces 31 is formed on a side end surface, of the transmission member 6b, towards the second clutch member 28, and a plurality of second cam surfaces 32 are correspondingly formed on a side end surface, of the second clutch member 28, towards the transmission member 6b. The first cam surfaces 31 and the second cam surfaces 32 form a cam mechanism disposed between the transmission member 6b and the second clutch member 28. When the rotating sleeve 6 is located at the initial position, the first cam surfaces 31 and the second cam surfaces 32 are mutually staggered, that is, concave-convex meshing. When the rotating sleeve 6 is rotated, the first cam surfaces 31 are driven to rotate to mutually abut the second cam surfaces 32, that is, concave-convex separating or convex-convex abutting, to make the second clutch member 28 produce displacement towards a direction of the clamping sleeve 6 along the axial direction of the main shaft, so that the second clutch member 28 can be engaged with or separated from the first clutch member 24. In short, when the rotating sleeve 6 moves from the initial position to the working position, the clutch mechanism 30 can be controlled to switch from the separating status to the engaging status, so that the clamping sleeve 13 is locked relative to the housing 2. When the rotating sleeve 6 returns from the working position to the initial position, the clutch mechanism 30 is switched from the engaging status to the separating status, so that the clamping sleeve 13 is unlocked relative to the housing 2.

One end, of the transmission mechanism housing 17a, close to the second clutch member 28 is provided with a spline part 27, and a keyway 26 is disposed on an inside wall of the second clutch member 28. By means of fitting between the keyway 26 and the spline part 27, the second clutch member 28 is sleeved on the transmission mechanism housing 17a and can move relative to the transmission mechanism housing 17a along the axial direction of the main shaft. A baffle 40 is disposed between the second clutch member 28 and the first clutch member 24, a plurality of notches 42 is disposed at an edge along a circumferential direction of the baffle 40, and the baffle 40 is connected with the spline part 27 by using a fastening member, so that axial movement of the second clutch member 28 relative to the spline part 27 is restricted, and the fastening member in this embodiment uses a screw 41. A spring member is disposed between the second clutch member 28 and the baffle 40. In this embodiment, the spring member uses a compression spring 45. Several concave holes 44 are disposed along a circumferential direction on a side end surface, of the second clutch member 28, close to the baffle 40, and several compression springs 45 are correspondingly disposed in the concave holes 44. One end of the compression spring 45 abuts the second clutch member 28, and the other end abuts the baffle 40; in this way, when the rotating sleeve 6 returns, the spring member makes the second clutch member 28 return, that is, the rotating sleeve 6 returns from the working position to the initial position, and the clutch mechanism 30 is switched from the engaging status to the separating status, so that the clamping sleeve 13 is unlocked relative to the housing 2.

The control mechanism 60 further includes one pair of reversing pushing blocks 62 that can alternatively adapt to the connecting member 6a, a reversing button 64 that slidably adapts to the reversing pushing block 62, and a master switch pushing button 68 that can selectively adapt to the connecting member 6a and that is used to activate the master switch 66. A spring member is disposed between the reversing pushing block 62 and the transmission mechanism 17, and in this embodiment of the present invention, a returning spring 48 is used.

Figure 6:
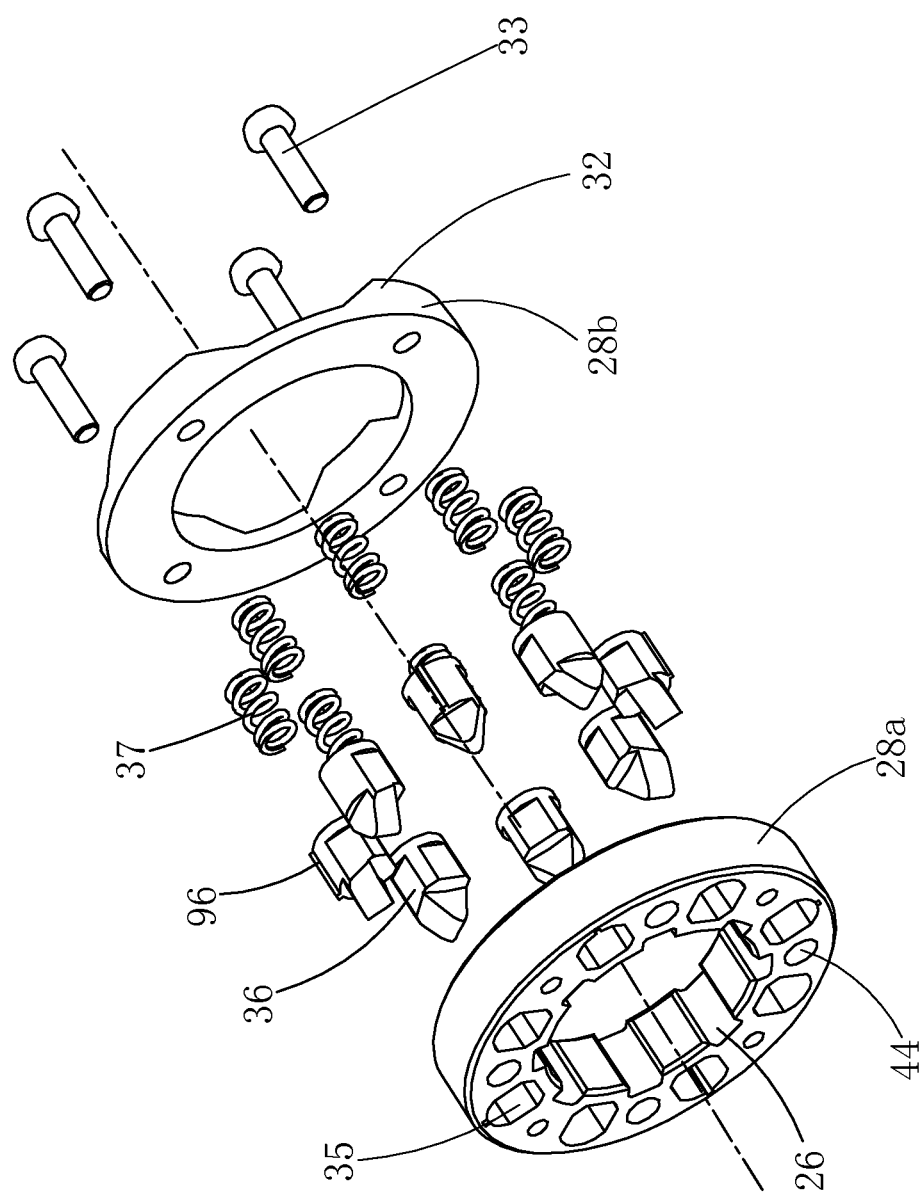
FIG. 6 is a schematic three-dimensional exploded view of a second clutch member in FIG. 5.

Referring to FIG. 6, the second clutch member 28 includes a supporting part 28a and a cam part 28b, where the supporting part 28a and the cam part 28b are fastened together by using a screw 33. The second cam surface 32 is disposed on the cam part 28b, and is located on a side end surface opposite to the supporting part 28a. The second clutch member 28 includes a second engaging member. In this embodiment, several restricting holes 35 are disposed along a circumferential direction on a side end surface, of the supporting part 28a, opposite to the cam part 28b. Several compression springs 37 correspond to the restricting holes 35 and are completely received in the restricting holes 35. Several blocking pins 36 correspond to the restricting holes 35 and the blocking pins 36 are partially supported in the restricting holes 35. Tip portions, of the blocking pins 36, exposed of the restricting holes 35 can penetrate out of the notches 42 of the baffle 40 and can be selectively engaged with the first engaging member of the first clutch member 24. One end of the compression spring 37 abuts the cam part 28b, and the other end abuts the blocking pin 36, so that the blocking pin 36 can overcome an applied force of the compression spring 37 under stress and performs axial movement relative to the supporting part 28a. The blocking pin 36 as the second engaging member can be selectively engaged with or separated from the first engaging member of the first clutch member 24. In this embodiment, the first engaging member is configured as a ring gear 43 disposed on a side end surface, of the clamping sleeve 13, close to the second clutch member 28 (referring to FIG. 5). When the first engaging member is engaged with the second engaging member, that is, the tip portion of the blocking pin 36 is engaged with the ring gear 43, the clamping sleeve 13 is locked relative to the housing 2, and when the first engaging member is separated from the second engaging member, the clamping sleeve 13 can be rotated relative to the housing 2.

Figure 7:
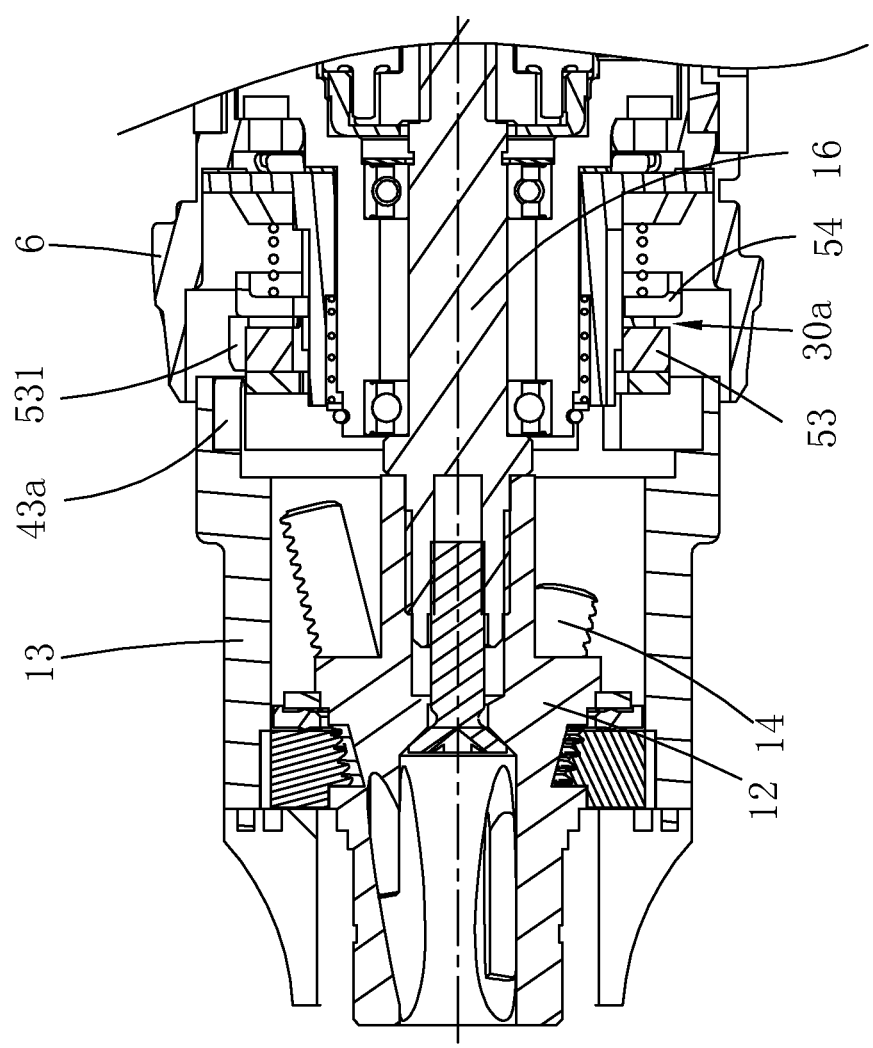
FIG. 7 is a sectional view of another clutch mechanism in the drill shown in FIG. 1, where the clutch mechanism is separated from a clamping sleeve in this case.
Figure 8:
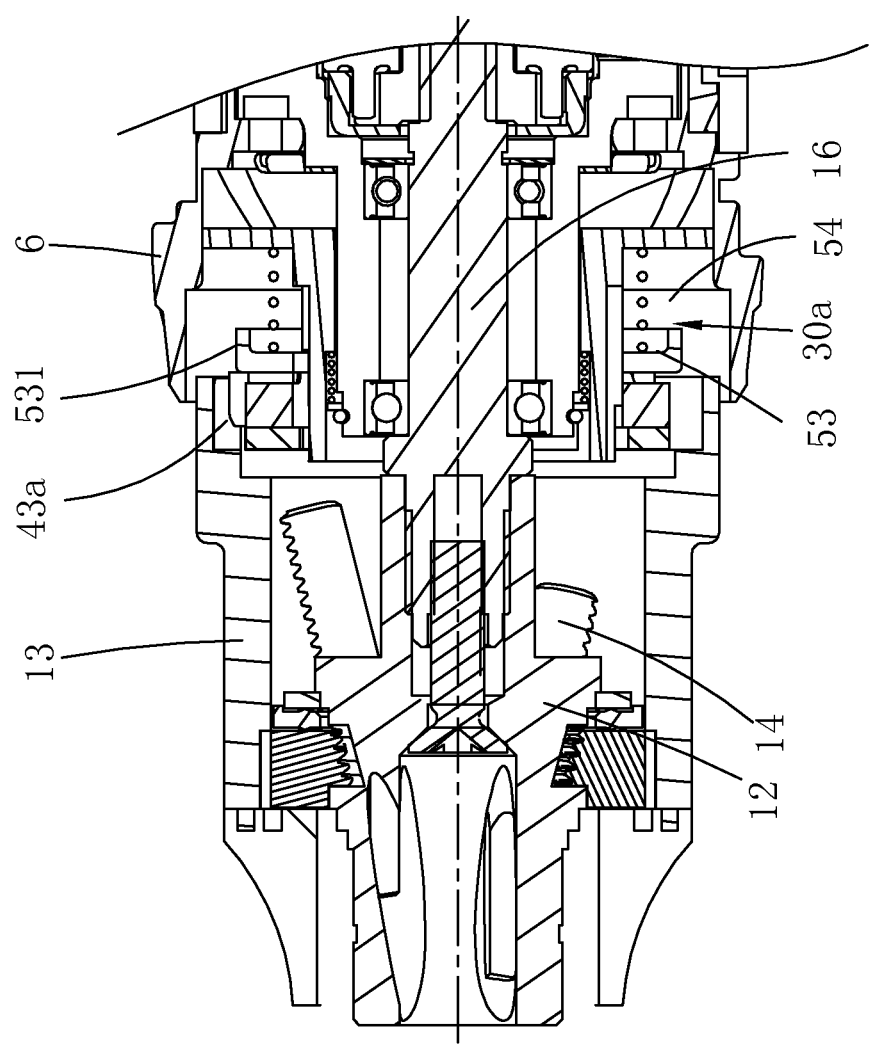
FIG. 8 is a sectional view of the engagement of the clutch mechanism and the clamping sleeve in FIG. 7.

The clutch mechanism is not limited to the foregoing structure and form, and FIG. 7 and FIG. 8 show another clutch mechanism 30a in this embodiment. The clutch mechanism 30a includes a first clutch member connected with the clamping sleeve 13, and a clutch assembly that adapts to the rotating sleeve 6. The first clutch member is configured as a ring gear 43a that is connected with the clamping sleeve 13 and whose inner circumference surface is provided with inner teeth. The clutch assembly includes an engaging member 53 and a clutch member 54. An outer circumference surface of the engaging member 53 is provided with outer teeth 531 that can be engaged with the ring gear 43a. An end surface, of the engaging member 53, opposite to the clutch member 54 is provided with first clutch teeth, and correspondingly, an end surface of the clutch member 54 is provided with second clutch teeth that fit the first clutch teeth. The clutch member 54 is fixed on the transmission mechanism housing 17a along a circumferential direction of the main shaft. A returning spring is disposed between the clutch member 54 and the engaging member 53. The rotating sleeve 6 rotates to drive the clutch member 54 to move along the axial direction of the main shaft to make the first clutch teeth engaged with the second clutch teeth, and then, the clutch member 54 drives the engaging member 53 to move along the axial direction of the main shaft to make the outer teeth 531 engaged with the ring gear 43a; in this way, the rotation of the clamping sleeve 13 relative to the housing 2 along the circumferential direction is locked. In this way, when the rotating sleeve 6 returns, the returning spring makes the clutch member 54 return, and makes the first clutch teeth separated from the second clutch teeth, and regardless of whether the outer teeth 531 is engaged with the ring gear 43a, the rotation of the clamping sleeve 13 is not limited. A manner in which the rotating sleeve 6 drives the clutch member 54 to move along the axial direction is the same as that in the foregoing structure, and details are not described herein again.

Figure 9:
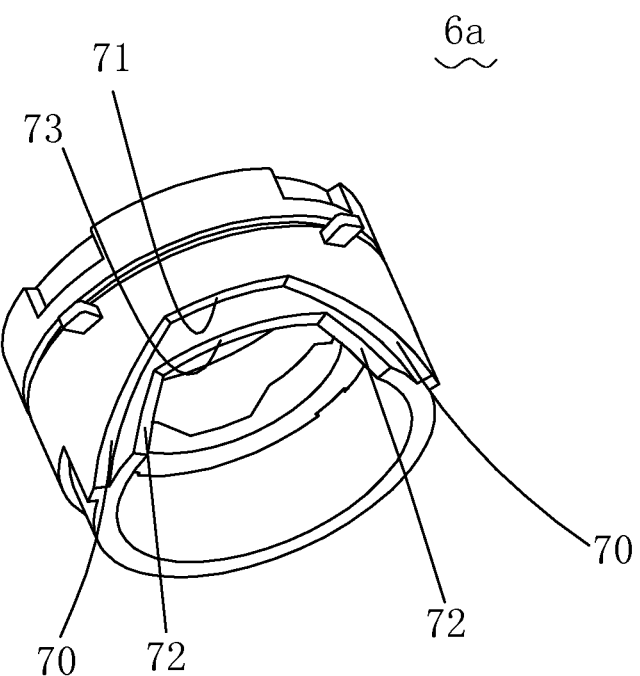
FIG. 9 is a schematic three-dimensional view of a connecting member in FIG. 5.
Figure 10:
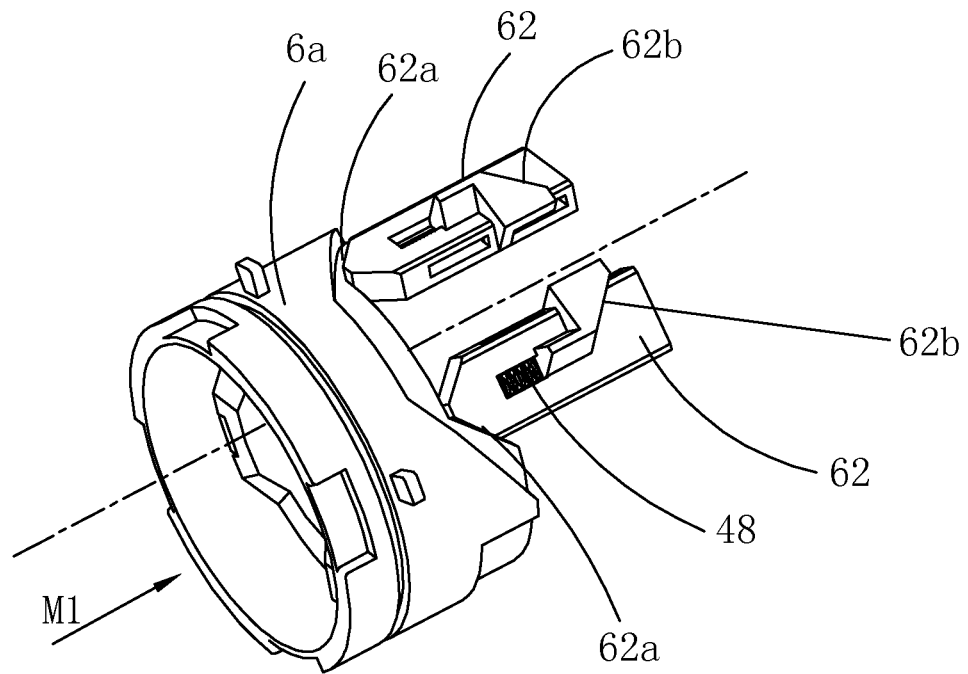
FIG. 10 is a schematic three-dimensional view of adapting of a connecting member at an initial position and one pair of reversing pushing blocks in FIG. 5.

Referring to FIG. 9 and FIG. 10, one pair of first slopes 70 and one pair of second slopes 72 are disposed on an outside surface of the connecting member 6a. The first slopes 70 are symmetrically distributed at two sides of a center line of the main shaft 16. A first straight plane 71 is connected between the first slopes 70. The second slopes 72 are also symmetrically distributed at the two sides of the center line of the main shaft 16. A second straight plane 73 is connected between the second slopes 72. The first straight plane 71 is substantially parallel to the second straight plane 73. Extension directions of the first slope 70 and the second slope 72 are substantially the same. One pair of reversing pushing blocks 62 are symmetrically distributed at two sides of the main shaft 16, the reversing pushing blocks 62 are separately provided with a first inclined plane 62a used to slidably adapt to the second slope 72, and a second inclined plane 62b used to slidably adapt to the reversing button 64. When the rotating sleeve 6 is rotated towards a direction, the second slope 72 of the connecting member 6a abuts a corresponding first inclined plane 62a and makes the reversing pushing block 62 move along the axial direction, shown by an arrow M1, of the main shaft 16. When the rotating sleeve 6 is released, at the same time the rotating sleeve 6 rotates and returns, the reversing pushing block 62 can automatically return to the initial position under the action of the returning spring 48.

Figure 11:
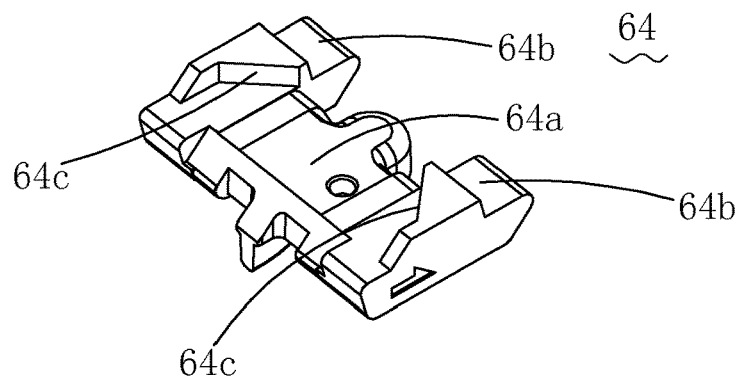
FIG. 11 is a schematic three-dimensional view of a reversing button in FIG. 5, where a front surface of the reversing button is visible in this case.
Figure 12:
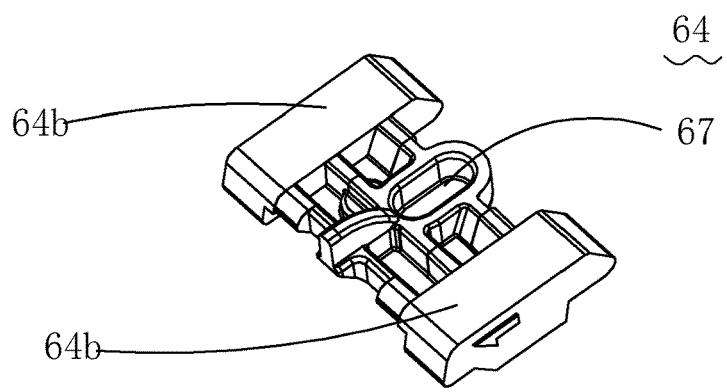
FIG. 12 is a schematic three-dimensional view of the reversing button in FIG. 5, where a back surface of the reversing button is visible in this case.
Figure 13:
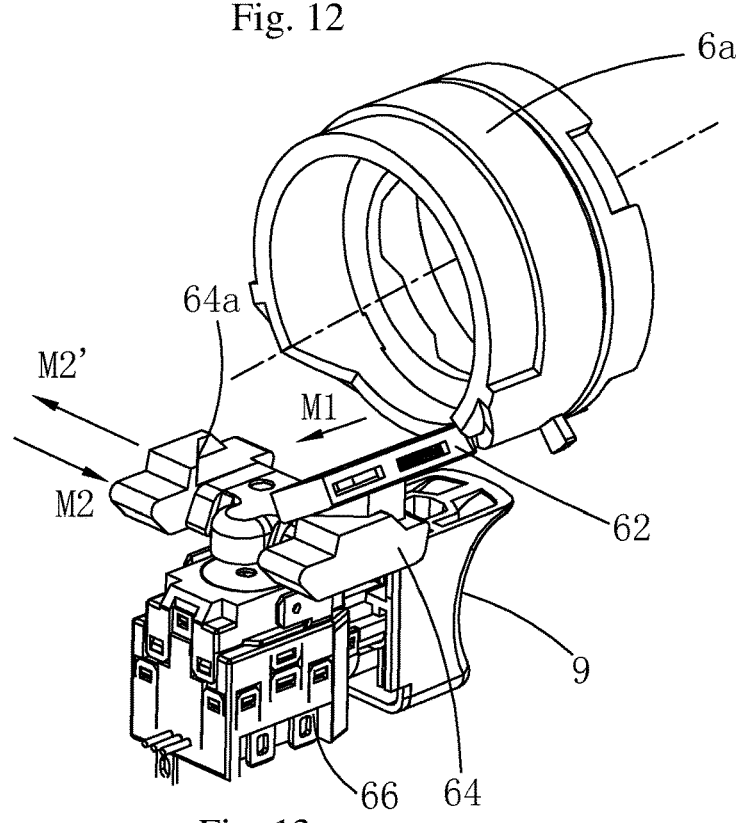
FIG. 13 is a schematic three-dimensional view of adapting of the connecting member in FIG. 5 and a reversing pushing block, adapting of the reversing pushing block and the reversing button, and adapting of the reversing button and a reversing switch and a master switch.

Referring to FIG. 11 to FIG. 13, the reversing button 64 includes a reversing portion 64a, and function portions 64b located at two sides of the reversing portion 64a. A side surface of each of the function portions 64b is provided with a reversing slope 64c. The reversing slope 64c is separately used to slidably adapt to a second inclined plane 62b of a corresponding reversing pushing block 62. One side, of the reversing portion 64a, opposite to the reversing slope 64c is provided with a waist-shaped groove 67, used to receive the toggle 65a of the reversing switch 65 (referring to FIG. 3). When the reversing pushing block 62 produces displacement along the axial direction, shown by the arrow M1, of the main shaft 16, under the action of the reversing pushing block 62, the reversing button 64 moves along a direction perpendicular to the axial direction of the main shaft 16, that is, moves along a direction shown by an arrow M2 or an arrow M2'.

Referring to FIG. 14 to FIG. 16, the toggle 65a is pivotably disposed on the reversing switch 65. When the reversing button 64 moves along the direction shown by the arrow M2, the toggle 65a received in the waist-shaped groove 67 is pivoted to the first working position, that is, pivoted to a position for controlling forward rotation of the motor 18. When the reversing button 64 moves along a direction opposite to the arrow M2, that is, moves along the direction shown by the arrow M2', the toggle 65a received in the waist-shaped groove 67 is pivoted to the second working position, that is, pivoted to a position for controlling reverse rotation of the motor 18. When the reversing button 64 is located between the first working position and the second working position, that is, the toggle 65a is located at the initial position, the master switch 66 cannot be activated. The master switch 66 can be activated only when the toggle 65a of the reversing switch 65 moves to the first or second working position, and the motor 18 performs forward rotation or reverse position. As can be seen from the above, by means of interaction between the connecting member 6a and the reversing pushing block 62, reversing button 64 can be driven to move along a preset direction by rotating the rotating sleeve 6 to the working position. The reversing button 64 drives the toggle 65a to control a rotation direction of the motor 18, that is, the connecting member 6a, the reversing pushing block 62, and the reversing button 64 forms a first transmission mechanism from the rotating sleeve 6 to the toggle 65a or from the rotating sleeve 6 to the reversing switch 65, and the toggle 65a or the reversing switch 65 forms a reversing member in this embodiment. When the rotating sleeve 6 moves from the initial position to the working position, the reversing member can be activated by using the first transmission mechanism.

Figure 17:
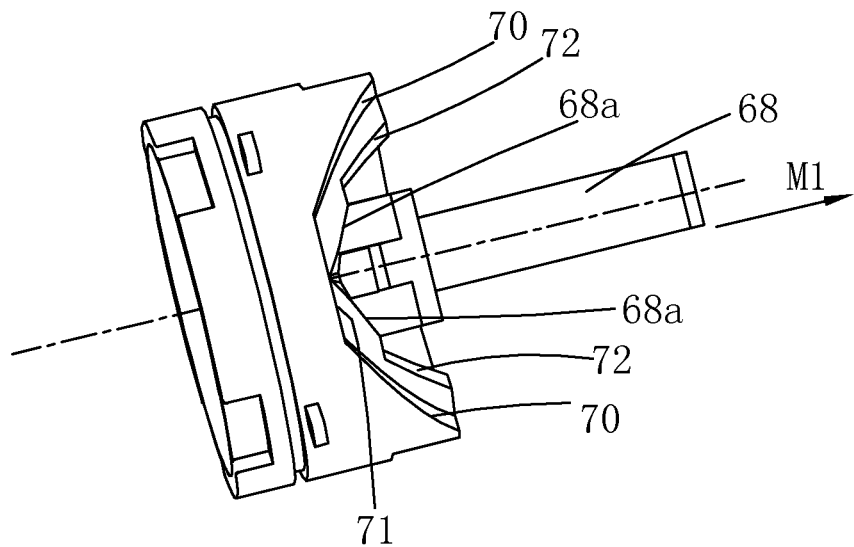
FIG. 17 is a schematic three-dimensional view of adapting of the connecting member at the initial position and a master switch pushing button in FIG. 5.
Figure 18:
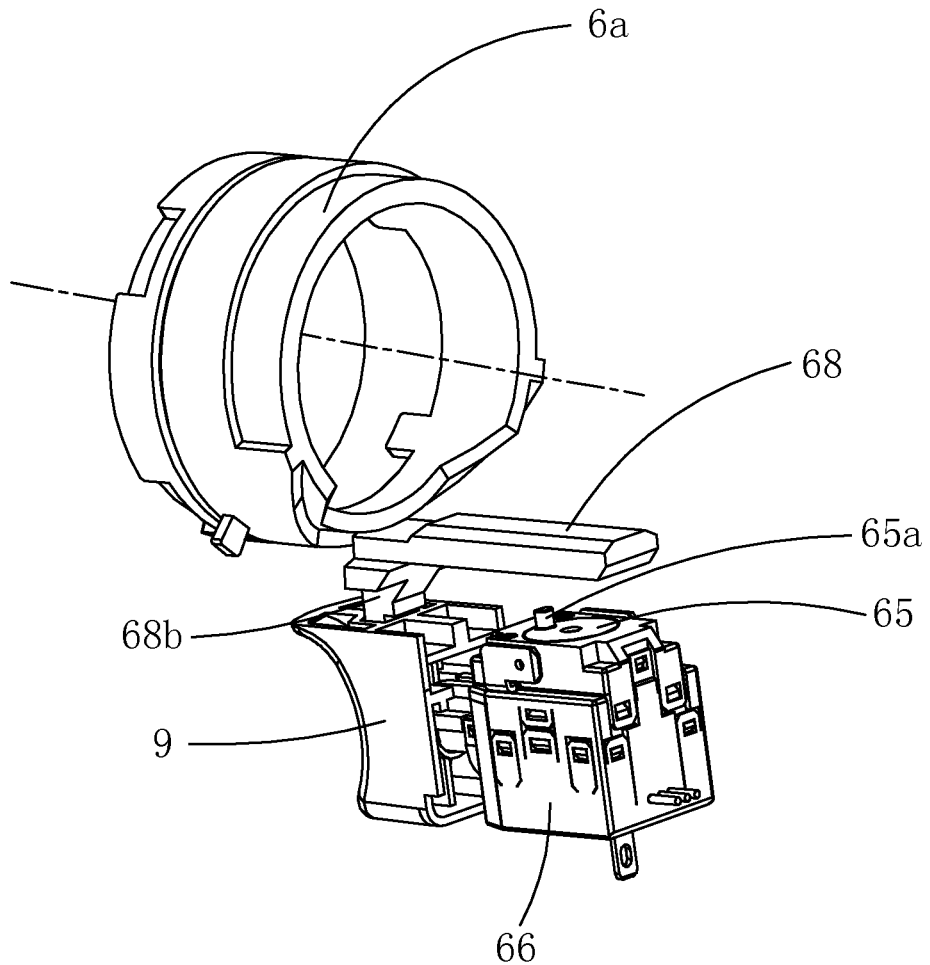
FIG. 18 is a schematic three-dimensional view of adapting of the connecting member and the master switch pushing button, adapting of the master switch pushing button and a master switch button, and the master switch button and the master switch in FIG. 5.

Referring to FIG. 17 and FIG. 18, the master switch pushing button 68 is provided with one pair of pushing button slopes 68a, which can separately slidably adapt to the first slopes 70 correspondingly. When the rotating sleeve 6 is located at the initial position, the master switch pushing button 68 abuts the first straight plane 71 located between the first slopes 70. When the rotating sleeve 6 drives the connecting member 6a to rotate towards one side relative to the housing 2 by using an axis of the main shaft 16 as a rotation center line, the pushing button slope 68a slidably adapts to a corresponding first slope 70, to make the master switch pushing button 68 to move along the axial direction, shown by the arrow M1, of the main shaft 16. The master switch pushing button 68 is provided with a contact foot 68b that extends towards a direction of the master switch 66. The contact foot 68b adapts to the master switch button 9, so that the master switch pushing button 68 and the master switch button 9 are disposed in a linked manner. When the master switch pushing button 8 moves along the direction shown by the arrow M1, the master switch button 9 is driven to move together to activate the master switch 66. As can be seen from the above, by means of interaction between the connecting member 6a and the master switch pushing button 68, the master switch pushing button 68 can be driven to move by rotating the rotating sleeve 6 to the working position, that is, the connecting member 6a and the master switch pushing button 68 form a second transmission mechanism from the rotating sleeve 6 to the master switch 66, and when the rotating sleeve 6 moves from the initial position to the working position, the master switch 66 can be activated by using the second transmission mechanism, so as to start the motor 18. In this embodiment of the present invention, the master switch 66 and the reversing switch 65 are integrally disposed, and certainly, a person skilled in the art may perform adjustment according the inner structure of the housing 2.

Referring to FIG. 19 to FIG. 25, in order to clearly describe the working principle of the control mechanism 60, in this embodiment of the present invention, an example in which the control member performs forward rotation towards one side relative to the housing 2 by using the axis of the main shaft 16 as the rotation center line is used for exemplary description, and because a step of performing, by the control member, reverse rotation towards the other side relative to the housing 2 is substantially the same, details are not described again. It should be clear that, in this embodiment, forward and reverse that are mentioned indicate two opposite rotation directions, that is, a first direction and a second direction. When the rotating sleeve 6 rotates towards the first direction, the control mechanism 60 is used to control the chuck 3 clamping a drill bit 5. When the rotating sleeve 6 rotates towards the second direction, the control mechanism 60 controls the chuck 3 releasing the drill bit 5. That is, when the rotating sleeve 6 rotates to the working position, the control mechanism activates, and the rotating sleeve 6 has two working positions, which are symmetrically set at two sides of the initial position. A movement relationship among the transmission member 6b, the clutch mechanism 30, and the clamping sleeve 13, a movement relationship between the transmission member 6b and the reversing pushing block 62, a movement relationship between the reversing pushing block 62 and the reversing button 64, and a movement relationship between the transmission member 6b and the master switch pushing button 68 are described in detail below.

Figure 19:
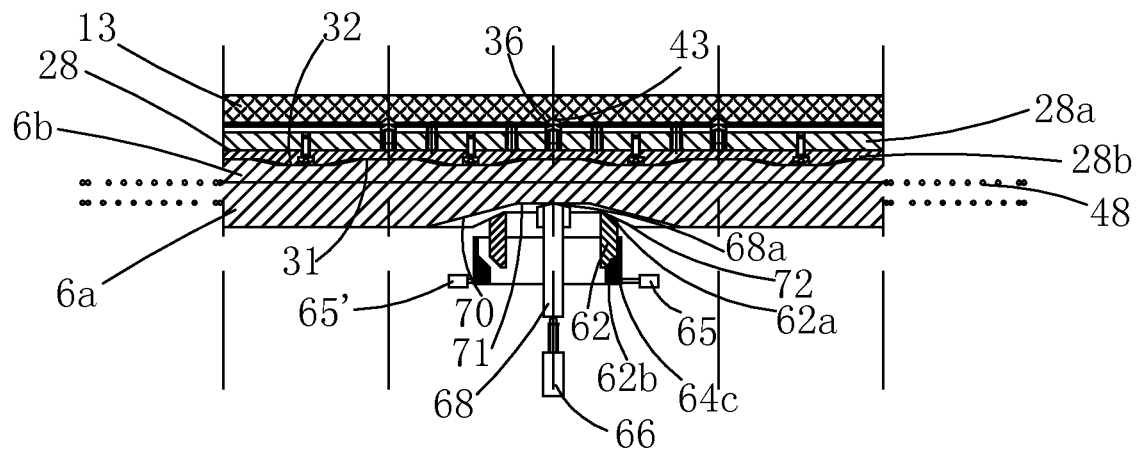
FIG. 19 is a schematic status view when a control mechanism of the drill is located at the initial position according to an embodiment of the present invention.

Referring to FIG. 19, when the rotating sleeve 6 is located at the initial position (not shown in the figure), the clutch mechanism between the transmission member 6b and the clamping sleeve 13 is disengaged, that is, the blocking pin 36 of the second clutch member 28 and the ring gear 43 of the first clutch member 24 are in the separating status. The first cam surface 31 on the transmission member 6b and the second cam surface 32 on the second clutch member 28 are located at positions that are mutually staggered. Assuming that when the rotating sleeve 6 is located at the initial position, the reversing switch 65 is exactly located at a position for reverse rotation, that is, the toggle 65a of the reversing switch 65 is exactly stopped at the second working position, in FIG. 19, a shown reversing switch 65' at the position for reverse rotation is conducted; in this case, the first inclined plane 62a of the reversing pushing block 62 exactly abuts a second slope 72 of a corresponding connecting member 6a, and the second inclined plane 62b abuts the reversing slope 64c of the reversing button 64; and the top of the pushing button slope 68a of the master switch pushing button 68 abuts the first straight plane 71.

Figure 20:
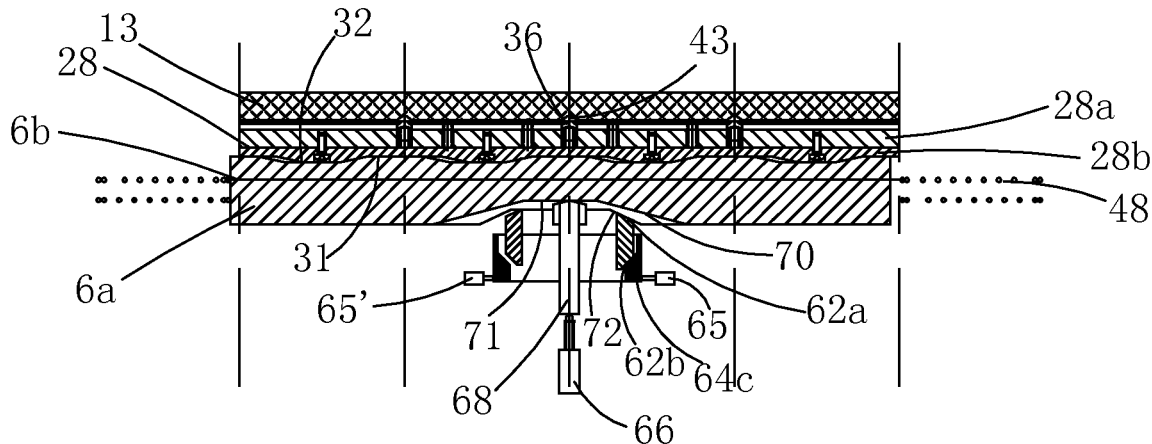
FIG. 20 is a schematic view when the control mechanism of the drill in FIG. 19 is in a first working status.

Referring to FIG. 20, when the rotating sleeve 6 starts to be rotated towards the first direction (not shown in the figure), the connecting member 6a drives the transmission member 6b to rotate, and the second cam surface 32 on the second clutch member 28 starts to approach the first cam surface 31 on the transmission member 6b; the second clutch member 28 approaches a direction of the first clutch member 24; the second inclined plane 62b slides on the reversing slope 64c of the reversing button 64, to produce displacement along the axial direction of the main shaft, and also pushes the reversing button 64 to produce displacement in a direction perpendicular to the axis of the main shaft; the reversing switch 65 starts to switch a direction; and the top of the pushing button slope 68a of the master switch pushing button 68 starts to slide towards a direction of the first slope 70 on the first straight plane 71.

Figure 21:
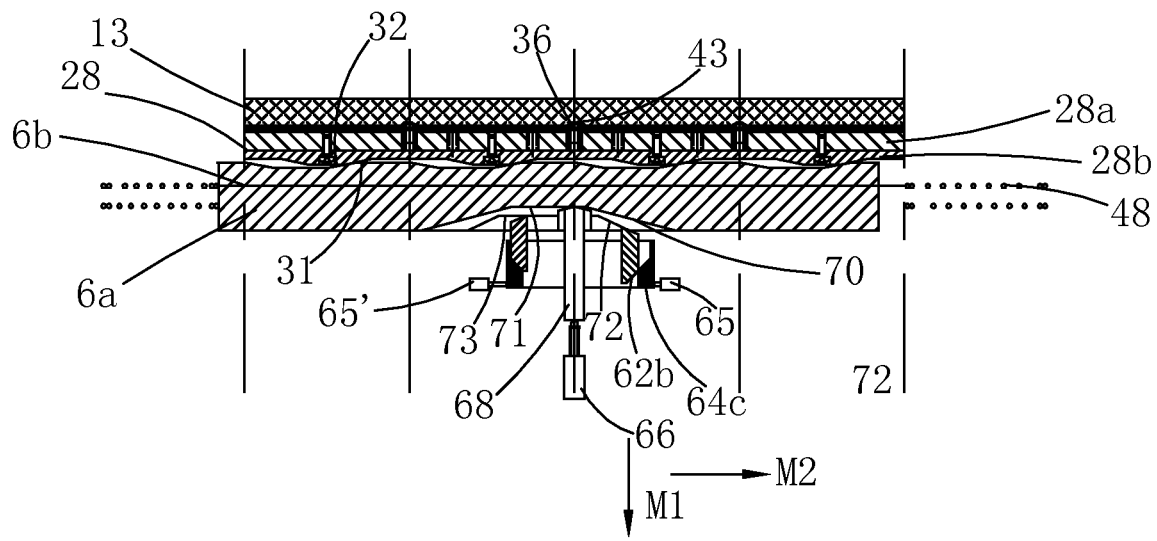
FIG. 21 is a schematic view when the control mechanism of the drill in FIG. 19 is in a second working status.

Referring to FIG. 21, when the rotating sleeve 6 is rotated to a specific angle, the connecting member 6a drives the transmission member 6b to rotate by a corresponding angle, and the second cam surface 32 on the second clutch member 28 starts to abut the first cam surface 31 on the transmission member 6b; the blocking pin 36 of the second clutch member 28 starts to be engaged with the ring gear 43 of the first clutch member 24; the second inclined plane 62b slides along the axial direction M1 of the main shaft to be disengaged with the reversing slope 64c of the reversing button 64, and the reversing button 64 moves towards a direction M2 perpendicular to the axial direction of the main shaft to completely switch the reversing switch 65, that is, the reversing switch 65 is conducted at a position for forward rotation; in this case, the top of the pushing button slope 68a of the master switch pushing button 68 continues to slide towards the first slope 70 on the first straight plane 71.

Figure 22:
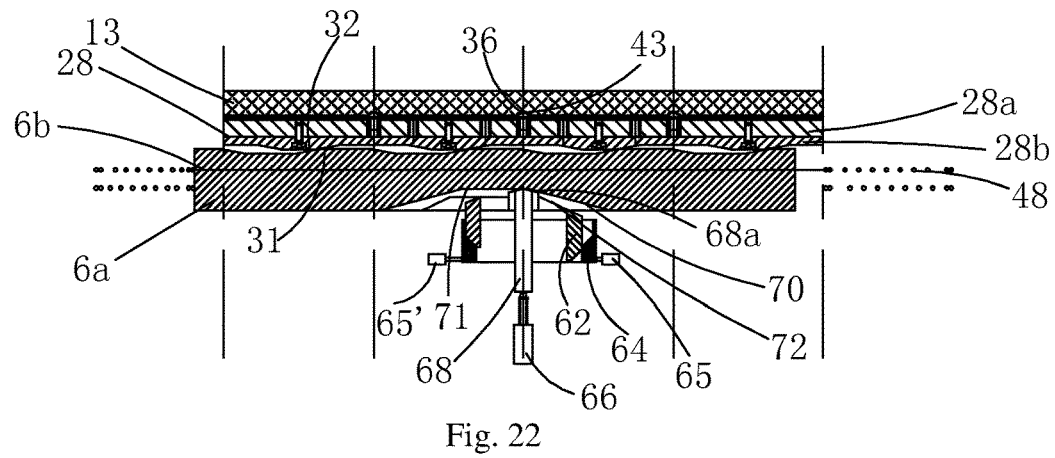
FIG. 22 is a schematic view when the control mechanism of the drill in FIG. 19 is in a third working status.

Referring to FIG. 22, the rotating sleeve 6 continues to be rotated, and the second cam surface 32 on the second clutch member 28 abuts the first cam surface 31 on the transmission member 6b, and pushes the second clutch member 28 to further approach the first clutch member 24; the second pushing block inclined plane 62b is disengaged with the reversing slope 64c of the reversing button 64 and then is bonded with the reversing button 64, and stops moving; and the top of the pushing button slope 68a of the master switch pushing button 68 further moves towards the first slope 70 on the first straight plane 71.

Figure 23:
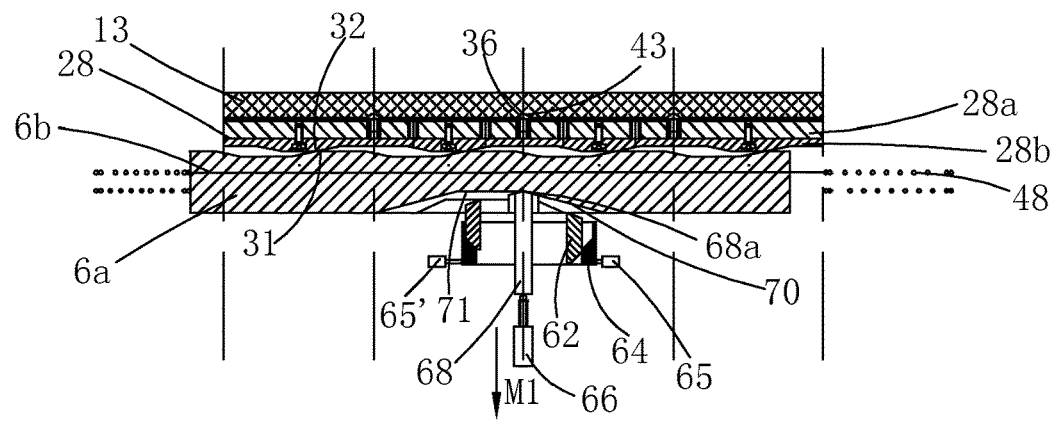
FIG. 23 is a schematic view when the control mechanism of the drill in FIG. 19 is in a fourth working status.

Referring to FIG. 23, the rotating sleeve 6 is further rotated, and when the second clutch member 28 is pushed by the transmission member 6b, the second cam surface 32 further abuts the first cam surface 31, and the blocking pin 36 is completely engaged with the ring gear 43 of the first clutch member 24. The pushing button slope 68a of the master switch pushing button 68 abuts the first slope 70, and the master switch pushing button 68 starts to be pushed to move along the axial direction M1 of the main shaft.

Figure 24:
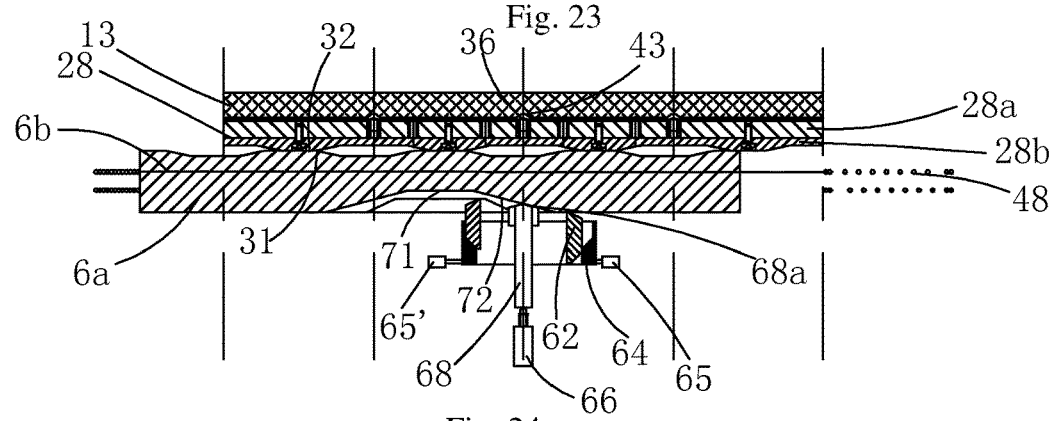
FIG. 24 is a schematic view when the control mechanism of the drill in FIG. 19 is in a fifth working status.

Referring to FIG. 24, the rotating sleeve 6 is further rotated to make the rotating sleeve 6 at the first working position, the master switch pushing button 68 moves to a position for switching on the master switch 66, and power is supplied to make the motor 18 rotate along a forward direction.

Figure 25:
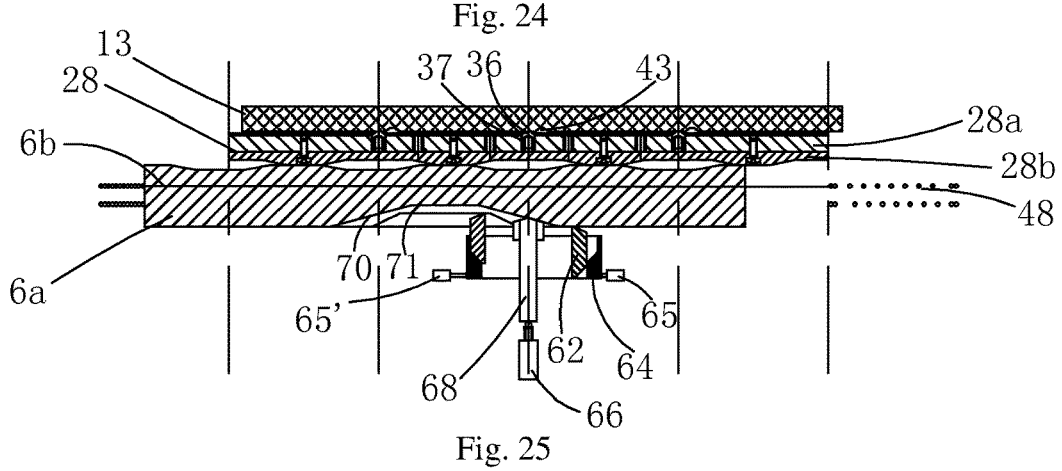
FIG. 25 is a schematic view when the control mechanism of the drill in FIG. 19 is in a sixth working status.

Further referring to FIG. 25, when the motor 18 drives the main shaft 16 connected with the chuck 3 to perform forward rotation, because of an engaging function of the clutch mechanism 30, the clamping sleeve 13 is in a relatively fixed status for the housing 2, so that the jaws 14 produce displacement, relative to the clamping sleeve 13 on the chuck body 12, along the axial direction of the main shaft 16, so as to lock the drill bit 5 in the chuck 3. Once the drill bit 5 is locked, the jaws 14 do not move relative to the chuck body 12 along the axial direction, while the main shaft 16 still continues to rotate. Because of a counterforce of the clamping sleeve 13, the blocking pin 36 of the second clutch member 28 compresses the compression spring 37 to retract, so as to be disengaged with the ring gear 43 of the clamping sleeve; in this case, an operator can hear slipping sound of the blocking pin 36 on a surface of the ring gear 43, and the rotating sleeve 6 can return to the initial position as long as the rotating sleeve 6 is released. In this way, a locking operation on the drill bit 5 is completed by using the control mechanism 60.

When the drill bit 5 locked in the chuck 3 needs to be released from the chuck 3, the control member only needs to be operated reversely, that is, the rotating sleeve 6 is rotated towards the second direction, so that the rotating sleeve 6 is located at the second working position. In a process of rotating the rotating sleeve 6, the clutch mechanism 30 is engaged, and the clamping sleeve 13 is fixed relative to the housing 2, the reversing button 64 drives the toggle 65a of the reversing switch 65 to the position for reverse rotation, and the master switch pushing button 68 pushes the master switch button 9 to activate the master switch 66. Once the motor 18 drives the main shaft 16 to perform reverse rotation, the jaws 14 produces, relative to the clamping sleeve 13 on the chuck body 12, displacement along a direction opposite to that of a clamping operation, so as to release the drill bit 5 from the chuck 3.

As can be seen from the above, a first working site, a second working site, and a third working site are included between the initial position and each working position. When the rotating sleeve 6 is located at the initial position, the clutch mechanism 30 is separated, when the rotating sleeve 6 is located at the first working site, the clutch mechanism is engaged to make the clamping sleeve 13 locked relative to the housing 2, when the rotating sleeve 6 is located at the second working site, the reversing member is activated, and when the rotating sleeve 6 is located at the third working site, the master switch is activated. Because the rotating sleeve 6 has two working positions, there are two corresponding first working sites, second working sites, and third working sites, which are symmetrically set at the two sides of the initial position. Regardless of whether the drill bit 5 is locked in the chuck 3 or the drill bit is released from the chuck 3, in a process in which the rotating sleeve 6 moves from the initial position to the working position, the control mechanism 60 first needs to lock the clamping sleeve with the housing, activates the reversing member, and finally activates the switch, that is, locking the clamping sleeve and activating the reversing member can be performed simultaneously, that is, the first working site is the same as the second working site, or the clamping sleeve may be first locked and then the reversing member is activated, or the reversing member is first activated and then the clamping sleeve is locked, as long as it is ensured that the clamping sleeve is locked and the reversing member is activated before the master switch is activated, so that an operation on the drill is more safe and reliable.

An automatic mode in which the control member is operated to lock or release the chuck is described above, and certainly, if an operator does not want to use the automatic mode, the operator can also use a manual mode in which the clamping sleeve is selected to be operated to move relative to the chuck body, as long as the clamping sleeve is set to have a part that is exposed externally and can be operated.

That the control member is operated to automatically lock or release the drill bit 5 in a mechanical manner is described above, and a specific operation method includes the following steps: operating the rotating sleeve 6 to move from the initial position to the working position; and then releasing the rotating sleeve 6. An operation of making the rotating sleeve 6 move from the initial position to the working position is rotating.

That the control member is operated to automatically lock or release the drill bit 5 in a mechanical and electronic manner is described in details below.

Figure 26:
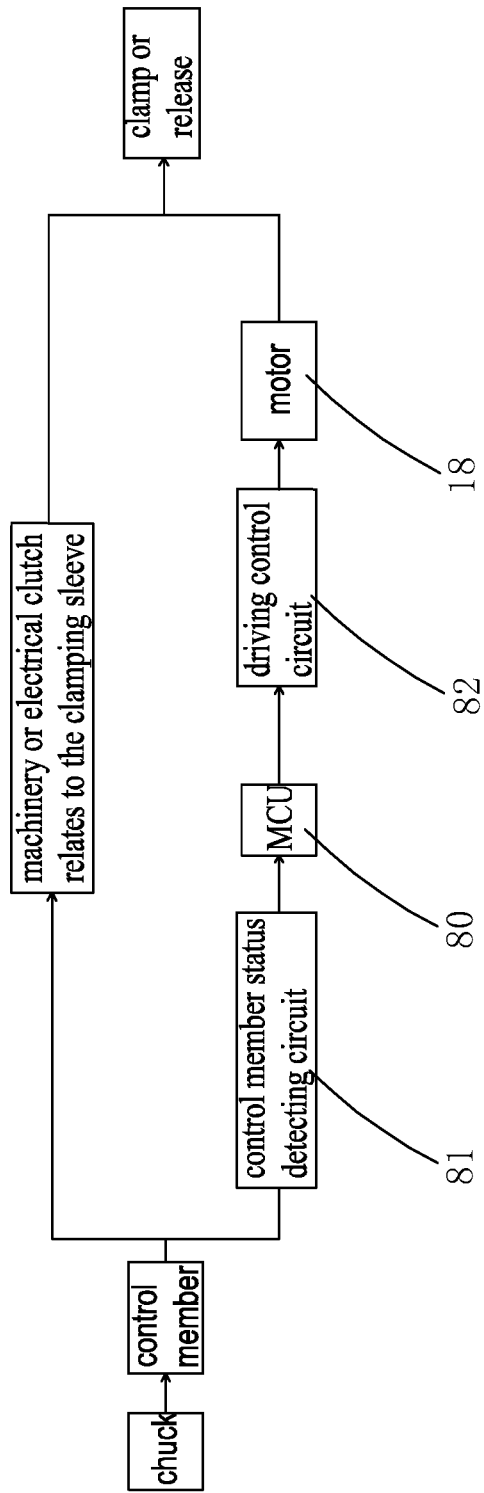
FIG. 26 is a view of the control principle of a drill according to a second preferred embodiment of the present invention.
Figure 30:
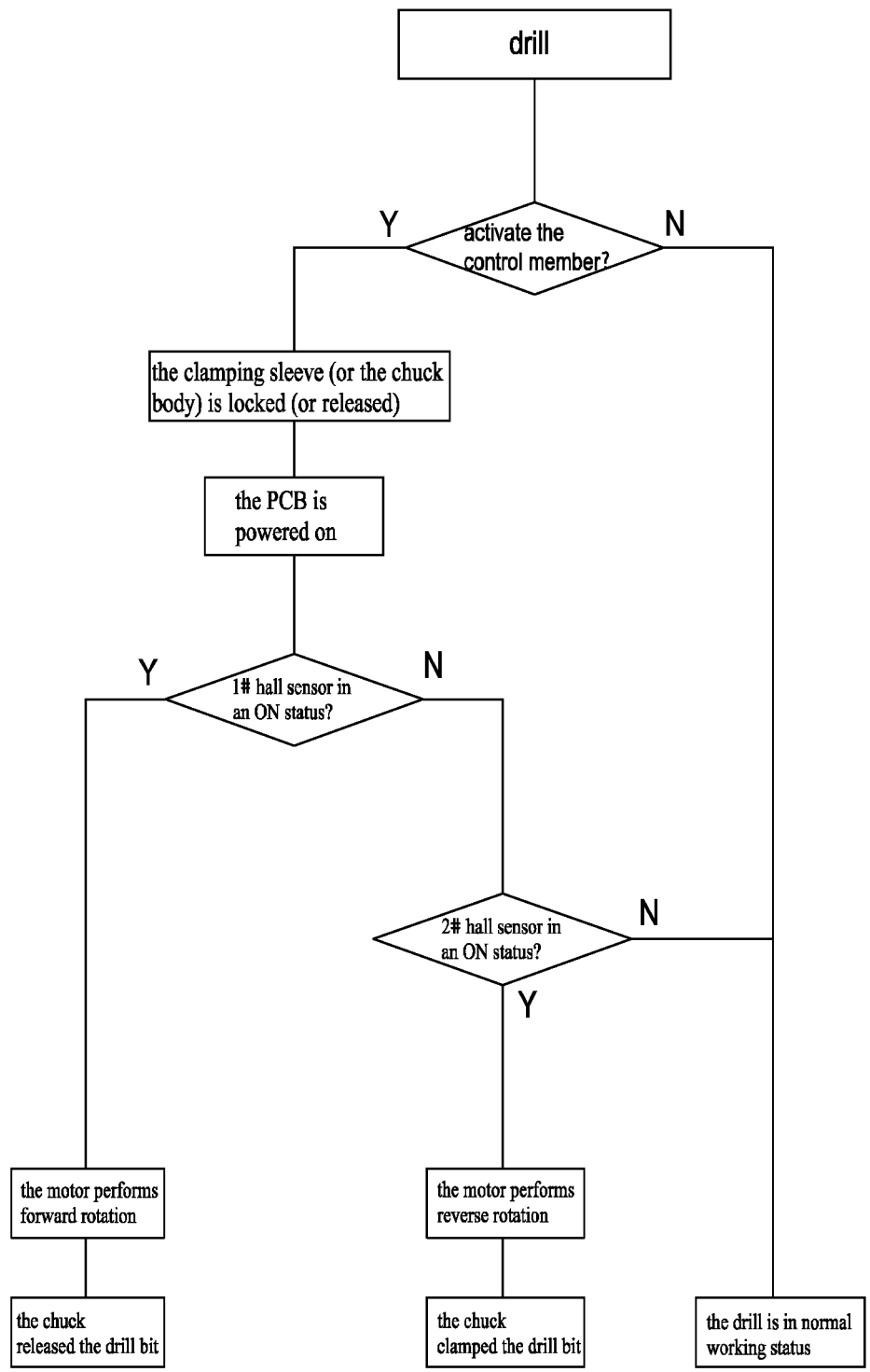
FIG. 30 is a flowchart of detecting, by the drill in FIG. 26, a position of a rotating sleeve by using the sensor, to control a motor.

FIG. 26 shows a view of the control principle of a drill in a second preferred embodiment, and the mechanical structure of the drill is the same as that in the first embodiment, but a manner of controlling a motor 18 is an electric manner. Specifically, a control mechanism 60a includes a control member for which an initial status or a working status can be operationally selected, a processor 80, a control member status detecting circuit 81, and a driving control circuit 82. The control member status detecting circuit 81 detects a physical status parameter, that is, a position, a switch or electric signal, or the like, of the control member. The processor 80 sends, according to the detected physical status parameter, a control signal corresponding to the physical status parameter. The driving control circuit 82 is used to receive the control signal of the processor 80 and controls the motor 18 to be started along a preset rotation direction, where the preset rotation direction is a rotation direction corresponding to locking or releasing a drill bit. The processor 80 may use an MCU, a PLC, or a CPU; and in this embodiment, the processor 80 is a micro computer control system (MCU). The control par may be still in a form of a rotating sleeve 6. The rotating sleeve 6 is movably disposed relative to a housing 2, and can move between an initial position and a working position that respectively correspond to the initial status and the working status, and a position of the rotating sleeve 6 is detected by using sensors.

FIG. 27 to FIG. 29 shows schematic views of detecting, by using the sensors, the position of the rotating sleeve. FIG.

30 shows a flowchart of detecting, by using the sensors, the position of the rotating sleeve to control the motor. The sensors include at least two hall sensors. Using two hall sensors as an example, a first hall sensor 811 and a second hall sensor 812 are installed on a printed circuit board (PCB) 810, the PCB is installed on a transmission mechanism housing 17a, a magnetic steel 813 is installed on the rotating sleeve 6, the rotating sleeve 6 is rotated to control a clamping sleeve 13 to be locked or not relative to the housing 2, the PCB is powered on, and the two hall sensors detect a position signal of the rotating sleeve 6 by using the magnetic steel. When the rotating sleeve 6 is located at the initial position, neither of the two hall sensors outputs a signal, that is, the two hall sensors are in an OFF status; in this case, the drill can work normally, as shown in FIG. 27. When the rotating sleeve 6 is rotated to the working position for releasing, the first hall sensor 811 detects a signal of the magnetic steel 813, and is in an ON status, and the second hall sensor 812 detects no signal of the magnetic steel 813, and is in an OFF status; in this case, the processor 80 instructs the driving control circuit 82 to control the motor 18 to rotate along a preset first direction to make a chuck release the drill bit, as shown in FIG. 28. When the rotating sleeve 6 is rotated to the working position for locking, the first hall sensor 811 detects no signal of the magnetic steel 813, and is in an OFF status, and the second hall sensor 812 detects a signal of the magnetic steel 813, and is in an ON status; in this case, the processor 80 instructs the driving control circuit 82 to control the motor to rotate along a preset second direction opposite to the first direction to make the chuck clamp the drill bit, as shown in FIG. 28.

In this embodiment, an electric clutch manner may also used, that is, the control mechanism 60a further includes a sensor used to measure a motor load parameter, where the motor load parameter may be a current that passes through the motor, a voltage of the motor, a rotation speed of the motor, or efficiency of the motor; and the processor performs a comparison operation on the motor load parameter detected by the sensor and a preset value, and when it is detected that the motor load parameter is greater than the preset value, controls the motor to stop.

In this embodiment, the control member may also be constructed as a signal switch. When the signal switch is activated, an electric signal is generated and transmitted to the processor, and in response to the electric signal, the processor controls the motor to be started along a preset rotation direction. In addition, in this embodiment, the clamping sleeve may be locked in an electric control manner. The control mechanism further includes an electromagnetic mechanism matched with the clamping sleeve or a chuck body. After receiving a signal indicating that the signal switch is switched on, the processor controls the electromagnetic device to be energized to lock the clamping sleeve or the chuck body with the housing. In addition, in the embodiment, a master switch may be not disposed, and only a reversing member for controlling a rotation direction of the motor and a trigger for controlling the motor to start and stop are disposed. The processor controls, according to a position signal of the reversing member, the motor to rotate along a preset direction, and the processor controls, according to a position signal of the trigger, the motor to start and stop.

An operator only needs to operate an operation part of the control mechanism to lock or release the drill bit 5, so that an operation is simple and convenient. The clamping sleeve or the chuck body is locked relative to the housing by using the control mechanism, and the motor is controlled to be started along a preset rotation direction, so as to make the clamping sleeve and the chuck body relatively move. In addition, various parts of the control mechanism adapt compactly, so that a power tool is very light and handy, and is convenient to carry.

Figure 31:
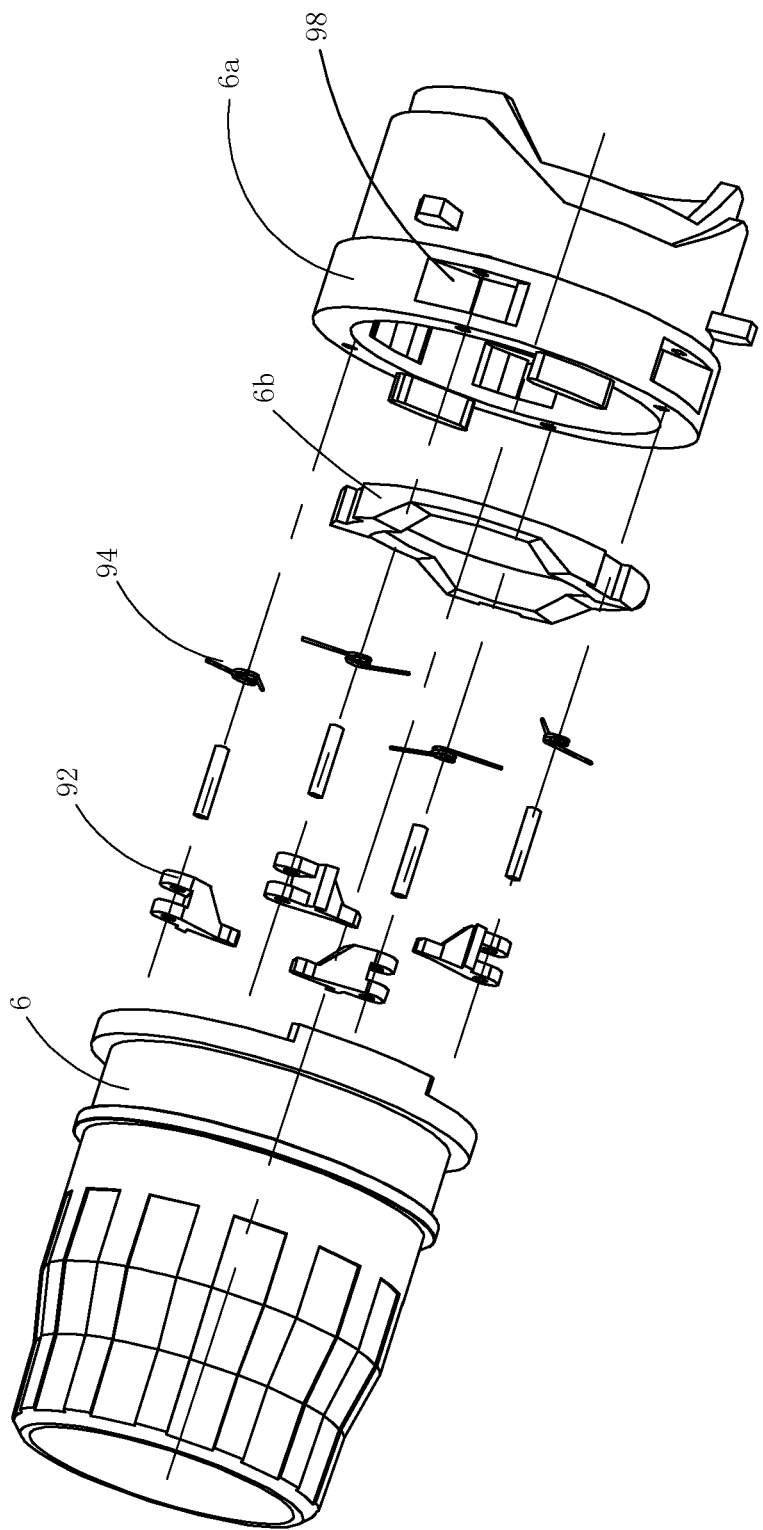
FIG. 31 is a schematic three-dimensional exploded view at the rotating sleeve, a retaining mechanism, a transmission member, and the connecting member in FIG. 5.

Referring to FIG. 31, in order to further make an operation convenient, a drill 10 further includes a retaining mechanism. When the rotating sleeve 6 moves to the working position, the control mechanism 60 can lock the clamping sleeve 13 or a chuck body 12 with the housing 2 (referring to FIG. 2 and FIG. 3), and the retaining mechanism retains the rotating sleeve 6 at the working position. In this way, when the rotating sleeve 6 is operated, the clamping sleeve 13 or the chuck body 12 not only can be locked relative to the housing 2, but also when the rotating sleeve 6 is rotated to the working position, the retaining mechanism can retain the rotating sleeve 6 at the working position, and the rotating sleeve 6 does not need to be additionally manually retained at the working position; therefore, an operation on the drill of the present invention is more convenient.

Further, the rotating sleeve 6 may be further operated to control the rotation direction of the motor. In this way, when the rotating sleeve 6 is operated, the clamping sleeve 13 or the chuck body 12 are made to be locked relative to the housing 2 and the rotation direction of the motor is controlled, the rotating sleeve 6 is retained at the working position, and a working attachment can be locked or released by starting the motor.

Referring to FIG. 11 to FIG. 13, in this preferred embodiment, specifically, the power tool further includes a reversing button 64 for controlling the rotation direction of the motor. The reversing button 64 can move between a start position and a reversing position. The control mechanism 60 further includes a first transmission mechanism connected between the rotating sleeve 6 and the reversing button 64. The rotating sleeve 6 moves from the initial position to the working position, and can make, by using the first transmission mechanism, the reversing button 64 move from the start position to the reversing position. Therefore, the rotation direction of the motor is controlled. How the rotating sleeve 6 makes, by using the first transmission mechanism, the reversing button 64 move is described in detail above, and details are not described herein again.

In order to further improve operation convenience of the drill, the rotating sleeve 6 may be further operated to control the motor to start and stop.

Referring to FIG. 11 to FIG. 13, specifically, the power tool further includes a master switch 66 for controlling the motor to start and stop, and the control mechanism 60 further includes a second transmission mechanism connected between the rotating sleeve 6 and the master switch 66. The rotating sleeve 6 moves from the initial position to the working position to activate the master switch 66 by using the second transmission mechanism. Similarly, how the rotating sleeve 6 activates the master switch by using the second transmission mechanism is described in detail above, and details are not described herein again.

In this embodiment, the rotating sleeve 6 can be operated to control the motor to rotate along a preset direction, that is, the rotating sleeve 6 can be operated to not only control the rotation direction of the motor, bus also control the motor to start and stop, so that an operation on the drill is more convenient.

Certainly, the reversing button 64 and the switch 66 may also be disposed separately. The rotating sleeve 6 does not control the reversing button 64 and the switch 66, and is only used to control the clamping sleeve 13 or the chuck body 12 to lock the clamping sleeve 13 or the chuck body 12 with the housing 2.

Referring to FIG. 6 and FIG. 31, a clutch mechanism 30 has an engaging status and a separating status. The retaining mechanism can be selectively separated from or engaged with the clutch mechanism 30. The rotating sleeve 6 moves from the initial position to the working position. The clutch mechanism 30 is in the engaging status to make the clamping sleeve 13 locked relative to the housing 2, and the clutch mechanism 30 and the retaining mechanism are engaged to retain the rotating sleeve 6 at the working position.

Referring to FIG. 5 and FIG. 31, in this preferred embodiment, specifically, as described above, the clutch mechanism 30 includes a first clutch member 24 that is fixedly disposed relative to a clamping sleeve 13, and a second clutch member 28 connected with the rotating sleeve 6. The second clutch member 28 can be selectively engaged with or separated from the first clutch member 24 along an axial direction of a main shaft. When the second clutch member 28 is engaged with the first clutch member 24, the retaining mechanism fits the second clutch member 28 to retain the rotating sleeve 6 at the working position.

An elastic device 22 (referring to FIG. 5) is disposed between the rotating sleeve 6 and the housing 2, the clutch mechanism is separated from the retaining mechanism, and the elastic device 22 provides an elastic force to make the rotating sleeve 6 return from the working position to the initial position. Preferably, the elastic device 22 is set to be a compression spring, and certainly, may also be a torsional spring or a tension spring.

Referring to FIG. 31, further, the retaining mechanism includes a retaining member 92 pivotably disposed relative to the rotating sleeve 6, and a spring member 94 that makes the retaining member 92 contact with the second clutch member 28 all the time. In this preferred embodiment, the retaining member 92 is pivotably disposed on a connecting member 6a, and the spring member 94 are disposed between the rotating sleeve 6 and the retaining member 92.

The second engaging member includes a raised portion 96 that extends outward along a radial direction, when the second engaging member is engaged with the first engaging member, the raised portion 96 stops the retaining member 92, so as to retain the rotating sleeve 6 at the working position, and when the second engaging member is separated from the first engaging member, the raised portion 96 is away from the retaining member 92. Finally, the rotating sleeve 6 returns from the working position to the initial position under the action of the elastic device 22.

In this preferred embodiment, the retaining member 92 is pivotably disposed in the connecting member 6a. Specifically, a receiving chamber 98 is disposed on the connecting member 6a, an opening of the receiving chamber 98 is located on an outer circumference surface of the connecting member 6a, and the retaining member 92 is at least partially received in the receiving chamber 98.

Further, the retaining member 92 is pivotably disposed by using a pivot 100, the pivot 100 is disposed in the receiving chamber 98, the spring member 94 that makes the retaining member 92 contact with the second clutch member 28 all the time is set to be a torsional spring, the torsional spring is disposed on the pivot 100, one end of the torsional spring abuts a side surface of the receiving chamber 98, and the other end of the torsional spring abuts the retaining member 92.

The working position of the rotating sleeve 6 includes a first working position and a second working position. When at the first working position, the working attachment is locked. When at the second working position, the working attachment is released. Correspondingly, there are at least two retaining members 92, where one retaining member 92 is used to retain the rotating sleeve 6 at the first working position, and the other retaining member is used to retain the rotating sleeve 6 at the second working position.

Specifically, the rotating sleeve 6 has a first rotation direction and a second rotation direction opposite to the first rotation direction. One retaining member 92 extends from a pivot axis of the retaining member 92 to a direction opposite to the first rotation direction of the rotating sleeve 6, and the other retaining member 92 extends from a pivot axis of the retaining member 92 to a direction opposite to the second rotation direction of the rotating sleeve 6. Therefore, when the rotating sleeve 6 rotates towards the two opposite rotation directions to the first working position and the second working position respectively, the two retaining members 92 can respectively retain the rotating sleeve 6 at the first working position and the second working position.

Preferably, four retaining members 92 are set, where two retaining members 92 extend from pivot axes of the retaining members 92 to the direction opposite to the first rotation direction of the rotating sleeve 6, and the other two retaining members 92 extend from pivot axes of the retaining members 92 to the direction opposite to the second rotation direction of the rotating sleeve 6. Certainly, the retaining member 92 may also be set to another form.

Figure 34:
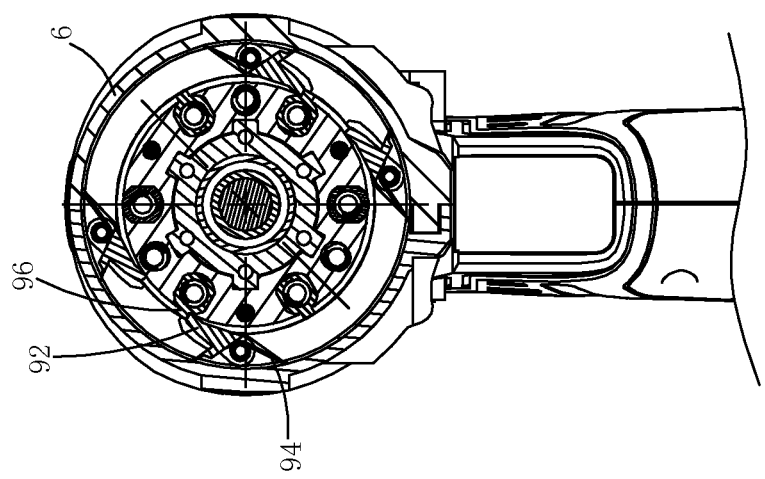
FIG. 34 is a sectional view at the retaining mechanism of the drill according to an embodiment of the present invention, where the rotating sleeve is located at the working position in this case.
Figure 33:
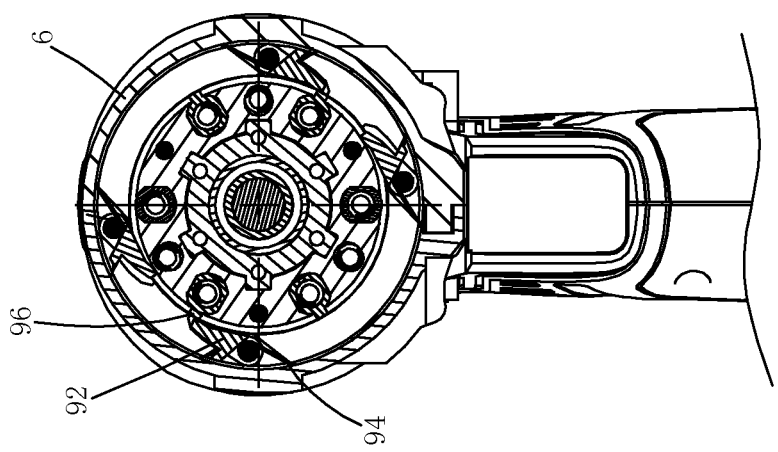
FIG. 33 is a sectional view at the retaining mechanism of the drill according to an embodiment of the present invention, where the rotating sleeve is located at a middle position between the initial position and the working position in this case.
Figure 32:
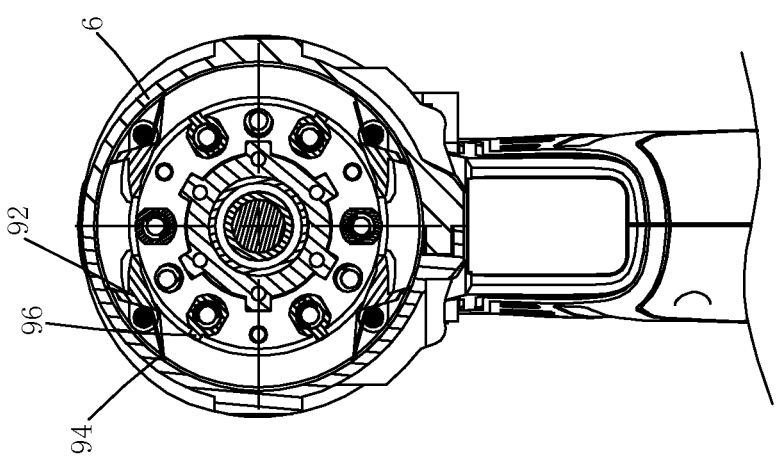
FIG. 32 is a sectional view at the retaining mechanism of the drill according to an embodiment of the present invention, where the rotating sleeve is located at the initial position in this case.

Referring to FIG. 32 to FIG. 34, in order to clearly describe that the retaining mechanism retains the rotating sleeve 6 at the working position, in this embodiment of the present invention, an example in which the rotating sleeve 6 rotates relative to the housing 2 towards the first rotation direction by using an axis of the main shaft as a rotation center line is used for exemplary description. Because a step of rotating, by the rotating sleeve 6, relative to the housing 2 towards the second rotation direction opposite to the first rotation direction is substantially the same, details are not described again.

Referring to FIG. 32, when the rotating sleeve 6 is located at the initial position (not shown in the figure), the retaining member 92 and the raised portion 96 on the second engaging member are separated, and the clutch mechanism 30 between the transmission member 6b and the clamping sleeve 13 (referring to FIG. 5) is disengaged.

Referring to FIG. 33, when the rotating sleeve 6 starts to be rotated towards the first rotation direction (not shown in the figure), the connecting member 6a is driven to rotate, so as to drive the retaining member 92 to rotate relative to the second clutch member 28 along a circumferential direction. When the retaining member 92 moves to the raised portion 96 of the second engaging member, the retaining member 92 is pushed by the raised portion 96 and overcome an applied force of the spring member 94 to rotate counterclockwise around the pivot 100.

Further referring to FIG. 34, when the rotating sleeve 6 continues to be rotated towards the first rotation direction, the connecting member 6a drives the retaining member 92 to rotate relative to the second clutch member 28 along the circumferential direction. When the retaining member 92 crosses the raised portion 96, the retaining member 92 rotates clockwise around the pivot 100 under the action of the spring member 94, so that the retaining member 92 is stopped by the raised portion 96, so as to retain the rotating sleeve 6 at the working position.

After a rotation torque of the main shaft reaches a specific value, the drill bit is locked or released, and the first engaging member is separated from the second engaging member, so that the raised portion 96 of the second engaging member is away from the retaining member 92, and finally, the rotating sleeve 6 returns from the working position to the initial position under the action of the elastic device 22.

The present invention is not limited to the foregoing embodiments, and a person skilled in the art can further make other replacements in the revelation of the technical essence of the present invention, and implemented functions that are the same as or similar to those in the present invention shall fall within the protection scope of the present invention.

The present invention is not limited to the foregoing embodiments, and a person skilled in the art can further make other replacements in the revelation of the technical essence of the present invention, and implemented functions that are the same as or similar to those in the present invention shall fall within the protection scope of the present invention.

The invention claimed is:

1. A power tool comprising:
a housing;
a motor disposed in the housing;
an output shaft driven by the motor to output a rotary power; and
a chuck configured to lock and release a working attachment, said chuck comprises a chuck body coupled with the output shaft, a plurality of jaws movably disposed relative to the chuck body, and a clamping sleeve sleeved outside the chuck body, the clamping sleeve is movable with respect to the chuck body so as to drive the plurality of jaws to retract and open relative to the chuck body;
wherein the power tool further comprises a control mechanism, the control mechanism is operable to lock the clamping sleeve or the chuck body relative to the housing, and to control the motor initiating along a preset rotary direction so that relative movement between the clamping sleeve and the chuck body is generated;
wherein the control mechanism comprises a control member being operable to move between an initial position and a working position, the control mechanism is active when the control member is located at the working position;
wherein the power tool further comprises a reversing member for controlling the rotary direction of the motor, the control mechanism further comprises a first transmission mechanism connected between the control member and the reversing member, the reversing member is activated by the first transmission mechanism when the control member moves from the initial position to the working position; and
wherein the first transmission mechanism comprises a pair of reversing pushing blocks which are movably along the axial direction of the output shaft, and a reversing button which is movable along a direction perpendicular to the axial direction and is selectively slidable coupling with one of the reversing pushing blocks, the reversing pushing blocks are symmetrically disposed at two sides of the reversing button, the reversing button is configured to activate the reversing member.

2. The power tool according to claim 1, wherein the control mechanism further comprises a connecting member connected with the control member, the connecting member is rotatable relative to the housing and provided with a pair of first slopes, the reversing pushing blocks are respectively provides with a first inclined plane abutted against the corresponding first slope and a second inclined plane abutted against the reversing button, the reversing button is provided with a pair of reversing slopes abutted against the second inclined planes respectively.

3. A power tool comprising:
a housing;
a motor disposed in the housing;
an output shaft driven by the motor to output a rotary power; and
a chuck configured to lock and release a working attachment, said chuck comprises a chuck body coupled with the output shaft, a plurality of jaws movably disposed relative to the chuck body, and a clamping sleeve sleeved outside the chuck body, the clamping sleeve is movable with respect to the chuck body so as to drive the plurality of jaws to retract and open relative to the chuck body;
wherein the power tool further comprises a control mechanism, the control mechanism is operable to lock the clamping sleeve or the chuck body relative to the housing, and to control the motor initiating along a preset rotary direction so that relative movement between the clamping sleeve and the chuck body is generated;
wherein the control mechanism comprises a control member being operable to move between an initial position and a working position, the control mechanism is active when the control member is located at the working position;
wherein the power tool further comprise a switch for switching on/off the motor, the control mechanism further comprises a second transmission mechanism connected between the control member and the reversing member, the switch is activated by the second transmission mechanism when the control member moves from the initial position to the working position; and
wherein the second transmission mechanism comprises a pushing button which is movable along the axial direction of the output shaft, the control mechanism further comprises a connecting member which is connected with the control member and rotatable relative to the housing, and the connecting member provided with a pair of second slopes, the pushing button is provided with a pair of pushing button slopes alternatively abutted against the second slopes, the pushing button is configured to activate the switch.

4. A power tool comprising:
a housing;
a motor disposed in the housing;
an output shaft driven by the motor to output a rotary power; and
a chuck configured to lock and release a working attachment, said chuck comprises a chuck body coupled with the output shaft, a plurality of jaws movably disposed relative to the chuck body, and a clamping sleeve sleeved outside the chuck body, the clamping sleeve is movable with respect to the chuck body so as to drive the plurality of jaws to retract and open relative to the chuck body;
wherein the power tool further comprises a control mechanism, the control mechanism is operable to lock the clamping sleeve or the chuck body relative to the housing, and to control the motor initiating along a preset rotary direction so that relative movement between the clamping sleeve and the chuck body is generated;

wherein the control mechanism comprises a control member being operable to move between an initial position and a working position, the control mechanism is active when the control member is located at the working position;

wherein the control mechanism further comprises a clutch mechanism disposed between the control member and the clamping sleeve, the clutch mechanism is configured to be in an engaging status and a separating status, the clutch mechanism converts from the separating status to the engaging status when the control member moves from the initial position to the working position, so that the clamping sleeve is fixed relative to the housing; and wherein the clutch mechanism comprises a first clutch unit fixedly disposed relative to the clamping sleeve and a second clutch unit coupled with the control member, the second clutch unit is movable along the axial direction of the output shaft and is selectively engaged with the first clutch unit or separated from thereof.

5. The power tool according to claim 4, wherein a stop device is disposed between the first clutch unit and the second clutch unit, the stop device is fixed relative to the housing, and a second spring is disposed between the stop device and the second clutch unit.

6. The power tool according to claim 5, wherein a plurality of receiving chambers are disposed in the second clutch unit, and the second spring comprises a plurality of compression springs matched with the receiving chambers, the compression spring is at least partially supported in the receiving chambers.

7. The power tool according to claim 4, wherein the control mechanism further comprises a transmission member which is disposed in the housing and coupled with the control member, the control member drives the second clutch to move along the axial direction of the output shaft by the transmission member when the control member moves from the initial position to the working position.

8. The power tool according to claim 7, wherein a cam mechanism is disposed between the transmission member and the second clutch unit.

9. The power tool according to claim 8, wherein the cam mechanism comprises a first cam part disposed in the transmission member and a second cam part disposed in the second clutch unit, the first cam part abuts against the second cam part by rotating of the control member and the second clutch unit moving along the axial direction of the output shaft.

10. The power tool according to claim 4, wherein the first clutch unit comprises a first engaging member, the second clutch unit comprises a supporting part and a second engaging member axially slidably disposed on the supporting part, the second engaging member is selectively engaged with the first engaging member or separated from thereof.

11. The power tool according to claim 10, wherein a first spring is disposed between the second engaging member and the supporting part.

12. The power tool according to claim 11, wherein the first engaging member is configured as a ring gear, the second engaging member comprises a plurality of blocking pins being engagable with the ring gear, the supporting part comprises a plurality of restricting holes corresponding to the blocking pins, the blocking pins are at least partially received in the restricting holes, the first spring comprises a plurality of compression springs corresponding to the restricting holes, the compression springs are totally received in the corresponding restricting holes and abuts against the corresponding blocking pins.

13. A power tool comprising:

a housing;

a motor disposed in the housing;

an output shaft driven by the motor to output a rotary power; and a chuck configured to lock and release a working attachment, said chuck comprises a chuck body coupled with the output shaft, a plurality of jaws movably disposed relative to the chuck body, and a clamping sleeve sleeved outside the chuck body, the clamping sleeve is movable with respect to the chuck body so as to drive the plurality of jaws to retract and open relative to the chuck body;

wherein the power tool further comprises a control mechanism, the control mechanism is operable to lock the clamping sleeve or the chuck body relative to the housing, and to control the motor initiating along a preset rotary direction so that relative movement between the clamping sleeve and the chuck body is generated;

wherein the control mechanism comprises a control member being operable to move between an initial position and a working position, the control mechanism is active when the control member is located at the working position;

wherein the control mechanism further comprises a clutch mechanism disposed between the control member and the clamping sleeve, the clutch mechanism is configured to be in an engaging status and a separating status, the clutch mechanism converts from the separating status to the engaging status when the control member moves from the initial position to the working position, so that the clamping sleeve is fixed relative to the housing; and wherein the clutch mechanism comprises a first clutch unit fixedly disposed relative to the clamping sleeve and a clutch assembly coupled with the control member, the clutch assembly comprises an engaging member and a clutch member, the engaging member is engagable with the first clutch unit and separated from thereof and is movable along the axial direction of the output shaft, the clutch member is engagable with the engaging member and separated from thereof and is movable along the axial direction of the output shaft.

14. A power tool comprising:

a housing;

a motor disposed in the housing;

an output shaft driven by the motor to output a rotary power; and a chuck configured to lock and release a working attachment, said chuck comprises a chuck body coupled with the output shaft, a plurality of jaws movably disposed relative to the chuck body, and a clamping sleeve sleeved outside the chuck body, the clamping sleeve is movable with respect to the chuck body so as to drive the plurality of jaws to retract and open relative to the chuck body;

wherein the power tool further comprises a control mechanism, the control mechanism is operable to lock the clamping sleeve or the chuck body relative to the housing, and to control the motor initiating along a preset rotary direction so that relative movement between the clamping sleeve and the chuck body is generated;

wherein the control mechanism comprises a control member being operable to move between an initial position and a working position, the control mechanism is active when the control member is located at the working position;

wherein an elastic device is disposed between the control member and the housing, the elastic device is configured to provide an elastic force for returning the control member from the working position to the initial position; and wherein the control mechanism further comprises a clutch mechanism disposed between the control member and the clamping sleeve, the clutch mechanism is configured to be in an engaging status and a separating status, wherein the clutch mechanism converts from the engaging status to the separating status when the control member moves from the working position to the initial position, so that locking of the clamping sleeve relative to the housing is unlocked.

15. A power tool comprising:
a housing;
a motor disposed in the housing;
an output shaft driven by the motor to output a rotary power; and
a chuck configured to lock and release a working attachment, said chuck comprises a chuck body coupled with the output shaft, a plurality of jaws movably disposed relative to the chuck body, and a clamping sleeve sleeved outside the chuck body, the clamping sleeve is movable with respect to the chuck body so as to drive the plurality of jaws to retract and open relative to the chuck body;
wherein the power tool further comprises a control mechanism, the control mechanism is operable to lock the clamping sleeve or the chuck body relative to the housing, and to control the motor initiating along a preset rotary direction so that relative movement between the clamping sleeve and the chuck body is generated;
wherein the control mechanism comprises a control member being operable to move between an initial position and a working position, the control mechanism is active when the control member is located at the working position; and
wherein the control mechanism further comprises a clutch mechanism disposed between the control member and the clamping sleeve, the clutch mechanism is configured to be in an engaging status and a separating status, wherein the power tool further comprises a retaining mechanism which is selectively engagable with the clutch mechanism or separated from thereof, the clutch mechanism is in the engaging status and engaged with the retaining mechanism when the control member moves from the initial position to the working position, so that the control member is retained in the working position.

16. The power tool according to claim 15, wherein an elastic device is disposed between the control member and the housing, the clutch mechanism is separated from the retaining mechanism when the clutch mechanism is in the engaging status, the elastic device is configured to provide an elastic force to return the control member from the working position to the initial position.

17. A power tool comprising:
a housing;
a motor disposed in the housing;
an output shaft driven by the motor to output a rotary power; and
a chuck configured to lock and release a working attachment, said chuck comprises a chuck body coupled with the output shaft, a plurality of jaws movably disposed relative to the chuck body, and a clamping sleeve sleeved outside the chuck body, the clamping sleeve is movable with respect to the chuck body so as to drive the plurality of jaws to retract and open relative to the chuck body;
wherein the power tool further comprises a control mechanism, the control mechanism is operable to lock the clamping sleeve or the chuck body relative to the housing, and to control the motor initiating along a preset rotary direction so that relative movement between the clamping sleeve and the chuck body is generated;
wherein the control mechanism comprises a control member being operable to move between an initial position and a working position, the control mechanism is active when the control member is located at the working position; and
wherein the control member is rotatable relative to the housing between the initial position and the working position, a rotation axis of the control member is parallel with or in line with the axis of the output shaft.

18. The power tool according to claim 17,
wherein the power tool comprises two operation modes comprise an auto mode of operating the control member to lock or release the working attachment, and a manual mode of operating the clamping sleeve to move relative to the chuck body.

19. A power tool comprising:
a housing;
a motor disposed in the housing;
an output shaft driven by the motor to output a rotary power; and
a chuck configured to lock and release a working attachment, said chuck comprises a chuck body coupled with the output shaft, a plurality of jaws movably disposed relative to the chuck body, and a clamping sleeve sleeved outside the chuck body, the clamping sleeve is movable with respect to the chuck body so as to drive the plurality of jaws to retract and open relative to the chuck body;
wherein the power tool further comprises a control mechanism, the control mechanism is operable to lock the clamping sleeve or the chuck body relative to the housing, and to control the motor initiating along a preset rotary direction so that relative movement between the clamping sleeve and the chuck body is generated;
wherein the control mechanism comprises a control member being operable to move between an initial position and a working position, the control mechanism is active when the control member is located at the working position;
wherein the working position comprises a first working position and a second working position, the control mechanism controls the motor to initiate in a first predetermined direction when the control member is in the first working position, the control mechanism control the motor to initiate in a second predetermined direction which is opposite to the first predetermined direction; and wherein the first working position and the second working position are symmetrically disposed at two sides of the initial position.

20. A power tool comprising:
a housing;
a motor disposed in the housing;
an output shaft driven by the motor to output a rotary power; and
a chuck configured to lock and release a working attachment, said chuck comprises a chuck body coupled with the output shaft, a plurality of jaws movably disposed relative to the chuck body, and a clamping sleeve sleeved outside the chuck body, the clamping sleeve is movable with respect to the chuck body so as to drive the plurality of jaws to retract and open relative to the chuck body;
wherein the power tool further comprises a control mechanism, the control mechanism is operable to lock the clamping sleeve or the chuck body relative to the housing, and to control the motor initiating along a preset rotary direction so that relative movement between the clamping sleeve and the chuck body is generated;
wherein the control mechanism comprises a control member being operable to move between an initial position and a working position, the control mechanism is active when the control member is located at the working position; and
wherein the power tool further comprises a reversing member for controlling the rotating direction of the motor and a switch for switching on/off the motor, the control mechanism is operable to fix the sleeve relative to the housing, activate the reversing member and then activate the switch during the control mechanism moving from the initial position to the working position.

21. The power tool according to claim 20, wherein the control mechanism further comprises a clutch mechanism disposed between the control member and the clamping sleeve, the working position comprises a first working position, a second working position and a third working position, the clutch mechanism is disengaged when the control member is in the initial position; the clutch mechanism is engaged to fix the clamping sleeve relative to the housing when the control member is in the first working position; the reversing member is activated when the control member is in the second working position, the switch is activated when the control member is in the third working position.

22. The power tool according to claim 21, wherein two sets of the first working position, the second working position and the third working position are symmetrically disposed at two sides of the initial position.

23. An operation for quick locking a working attachment of a power tool,
the power tool comprising
a housing,
a motor disposed in the housing,
an output shaft driven by the motor to output a rotary power, and
a chuck configured to lock and release a working attachment, said chuck comprises a chuck body coupled with the output shaft, a plurality of jaws movably disposed relative to the chuck body, and a clamping sleeve sleeved outside the chuck body, the clamping sleeve is movable with respect to the chuck body so as to drive the plurality of jaws to retract and open relative to the chuck body, wherein the power tool further comprises a control mechanism, the control mechanism is operable to lock the clamping sleeve or the chuck body relative to the housing, and to control the motor initiating along a preset rotary direction so that relative movement between the clamping sleeve and the chuck body is generated, and wherein the control mechanism comprises a control member being operable to move between an initial position and a working position, the control mechanism is active when the control member is located at the working position, the operation method comprising the following steps:
operating the control member to move from the initial position to the working position, and then releasing the control member,
wherein the control member is rotating from the initial position to the working position.

24. A power tool comprising:
a housing;
a motor disposed in the housing;
an output shaft driven by the motor to output a rotary power; and
a chuck configured to lock and release a working attachment, said chuck comprises a chuck body coupled with the output shaft, a plurality of jaws movably disposed relative to the chuck body, and a clamping sleeve sleeved outside the chuck body, the clamping sleeve is movable with respect to the chuck body so as to drive the plurality of jaws to retract and open relative to the chuck body;
wherein the power tool further comprises a control mechanism, the control mechanism is operable to lock the clamping sleeve or the chuck body relative to the housing, and to control the motor initiating along a preset rotary direction so that relative movement between the clamping sleeve and the chuck body is generated;
wherein the control mechanism comprises a control member operable to select to be in an initial status and a working status, a processor, a detecting circuit, and a driving circuit, wherein the detecting circuit is configured to detect a characteristic indicative of the control member physical state, the processor is configured to transmit a control signal according to a physical state characteristic detected by the detecting circuit, the driving circuit is configured to receive the control signal from the processor and control the motor initiating along a predetermined rotating direction;
wherein the control member is movable disposed relative to the housing and is movable between an initial position corresponding to the initial status and a working position corresponding to the working status, wherein the detecting circuit comprises a first sensor for detecting the position of the control member; and
wherein the first sensor comprises at least two hall sensors.

25. A power tool comprising:
a housing;
a motor disposed in the housing;
an output shaft driven by the motor to output a rotary power; and
a chuck configured to lock and release a working attachment, said chuck comprises a chuck body coupled with the output shaft, a plurality of jaws movably disposed relative to the chuck body, and a clamping sleeve sleeved outside the chuck body, the clamping sleeve is movable with respect to the chuck body so as to drive the plurality of jaws to retract and open relative to the chuck body;

wherein the power tool further comprises a control mechanism, the control mechanism is operable to lock the clamping sleeve or the chuck body relative to the housing, and to control the motor initiating along a preset rotary direction so that relative movement between the clamping sleeve and the chuck body is generated;

wherein the control mechanism comprises a control member operable to select to be in an initial status and a working status, a processor, a detecting circuit, and a driving circuit, wherein the detecting circuit is configured to detect a characteristic indicative of the control member physical state, the processor is configured to transmit a control signal according to a physical state characteristic detected by the detecting circuit, the driving circuit is configured to receive the control signal from the processor and control the motor initiating along a predetermined rotating direction;

wherein the control member is movable disposed relative to the housing and is movable between an initial position corresponding to the initial status and a working position corresponding to the working status, wherein the detecting circuit comprises a first sensor for detecting the position of the control member; and wherein the control mechanism further comprises a second sensor for detecting a characteristic indicative of the motor load, the processor compares the characteristic indicative of the motor load with a predetermined value, and the motor controls switching off when the characteristic indicative of the motor load exceeds to the predetermined value.

26. A power tool comprising:
a housing;
a motor disposed in the housing;
an output shaft driven by the motor to output a rotary power; and
a chuck configured to lock and release a working attachment, said chuck comprises a chuck body coupled with the output shaft, a plurality of jaws movably disposed relative to the chuck body, and a clamping sleeve sleeved outside the chuck body, the clamping sleeve is movable with respect to the chuck body so as to drive the plurality of jaws to retract and open relative to the chuck body;

wherein the power tool further comprises a control mechanism, the control mechanism is operable to lock the clamping sleeve or the chuck body relative to the housing, and to control the motor initiating along a preset rotary direction so that relative movement between the clamping sleeve and the chuck body is generated;

wherein the control mechanism comprises a control member operable to select to be in an initial status and a working status, a processor, a detecting circuit, and a driving circuit, wherein the detecting circuit is configured to detect a characteristic indicative of the control member physical state, the processor is configured to transmit a control signal according to a physical state characteristic detected by the detecting circuit, the driving circuit is configured to receive the control signal from the processor and control the motor initiating along a predetermined rotating direction;

wherein control member is configured as a signal switch, wherein when the signal switch is activated, an electric signal is generated and transmitted to the processor, the processor controls the motor initiating in a predetermined rotating direction in response to the electric signal; and wherein the control mechanism further comprises an electromagnetic mechanism matched with the clamping sleeve or the chuck body, wherein the processor controls the electromagnetic mechanism to generate electric current to fix the clamping sleeve or the chuck body relative to the housing after the processor received the electric signal from the signal switch.

* * * * *